US012469010B2

(12) United States Patent
Laxman et al.

(10) Patent No.: US 12,469,010 B2
(45) Date of Patent: Nov. 11, 2025

(54) VIRTUAL BUSINESS ASSISTANT AI ENGINE FOR MULTIPOINT COMMUNICATION

(71) Applicants: Srivatsan Laxman, Palo Alto, CA (US); Supriya A Rao, Palo Alto, CA (US)

(72) Inventors: Srivatsan Laxman, Palo Alto, CA (US); Supriya A Rao, Palo Alto, CA (US)

(*) Notice: Subject to any disclaimer, the term of this patent is extended or adjusted under 35 U.S.C. 154(b) by 1165 days.

(21) Appl. No.: 17/080,037

(22) Filed: Oct. 26, 2020

(65) Prior Publication Data

US 2021/0142291 A1 May 13, 2021

Related U.S. Application Data

(63) Continuation-in-part of application No. 16/917,882, filed on Jun. 30, 2020, now abandoned.

(60) Provisional application No. 62/869,160, filed on Jul. 1, 2019.

(51) Int. Cl.
*G06N 5/025* (2023.01)
*G06F 16/22* (2019.01)
*G06F 16/28* (2019.01)
*G06Q 10/107* (2023.01)

(52) U.S. Cl.
CPC .......... *G06Q 10/107* (2013.01); *G06F 16/22* (2019.01); *G06F 16/285* (2019.01); *G06N 5/025* (2013.01)

(58) Field of Classification Search
CPC ..... G06Q 10/107; G06F 16/22; G06F 16/285; G06N 5/025
See application file for complete search history.

(56) References Cited

PUBLICATIONS

Galitsky, B., Developing Enterprise Chatbots, received [Jan. 26, 2024]. Retrieved from Internet:<https://link.springer.com/book/10.1007/978-3-030-04299-8> (Year: 2019).*
Harms, J. et al, Approaches for Dialog Management in Conversational Agents, [received on Jan. 26, 2024]. Retrieved from Internet:<https://ieeexplore.ieee.org/abstract/document/8536470> (Year: 2018).*
Arcan, M., et al, Polylingual Wordnet, [received on Jan. 26, 2024]. Retrieved from Internet:<https://arxiv.org/abs/1903.01411> (Year: 2019).*
Ju, M., et al, A Neural Layered Model for Nested Named Entity Recognition, [received on Jan. 26, 2024]. Retrieved from Internet:<https://aclanthology.org/N18-1131/> (Year: 2018).*

(Continued)

*Primary Examiner* — Miranda M Huang
*Assistant Examiner* — Bart I Rylander

(57) ABSTRACT

A computerized method includes receiving a dialog session. The dialog session comprises a set of new inbound messages. The method feeds the dialog session into tokenizer. The method, with the tokenizer, generates a set of tokens by breaking the new inbound messages into a sequence of tokens. The method provides the tokens to a DAG frame labeler cascade. With the DAG frame labeler cascade, the method uses a sequence of tokens to generate a set of token labels. The method passes the token labels and tokens to an entity interpreter. With the entity interpreter, the method generates a DAG frame. With the DAG frame, the method outputs a structured information from a multiturn dialogue.

12 Claims, 23 Drawing Sheets

(56) References Cited

PUBLICATIONS

Vasilateanu, A., et al, Call-Center Virtual Assistant Using Natural Language Processing and Speech Recognition, [received on Jan. 26, 2024]. Retrieved from Internet:<https://jitdets.com/ojs/index.php/jitdets/article/view/20> (Year: 2018).*

Angeline, et al, Supermarket Automation with Chatbot and Face Recognition, [received on Jan. 26, 2024]. Retrieved from Internet:<https://ieeexplore.ieee.org/abstract/document/8723978> (Year: 2018).*

Borin, et al, Transferring Frames: Utilization of Linked Lexical Resources, [received on Jan. 26, 2024]. Retrieved from Internet:<chrome-extension://efaidnbmnnnibpcajpcglclefindmkaj/https://aclanthology.org/W12-1902.pdf> (Year: 2012).*

Dinarelli, et al, Models for Tree-Structured Named Entity Detection, {received on Jan. 26, 2024]. Retrieved from Internet:<chrome-extension://efaidnbmnnnibpcajpcglclefindmkaj/https://aclanthology.org/I11-1142.pdf> (Year: 2011).*

Gunawardana, et al, Autonomous Air Traffic Control Dialog management System to Enable Unmanned aircraft in the National Airspace System, [received on Jan. 26, 2024]. Retrieved from Internet:<chrome-extension://efaidnbmnnnibpcajpcglclefindmkaj/https://arc.aiaa.org/doi/pdf/10.2514/6.2013-1035> (Year: 2013).*

Kosovan, et al, Dialogue Generation using Neural Networks with Attention and Background Knowledge, [received on Jan. 26, 2024]. Retrieved from Internet:<.chrome-extension://efaidnbmnnnibpcajpcglclefindmkaj/https://jens-lehmann.org/files/2017/cscubs_dialogues.pdf> (Year: 2017).*

Razzaghi, et al, Context Free Frequently Asked Questions Detection Using Machine Learning Techniques, [received on Jan. 26, 2024]. Retrieved from Internet:<https://ieeexplore.ieee.org/abstract/document/7817112> (Year: 2016).*

Rei, M., et al, Zero-shot Sequence Labeling: Transferring Knowledge from Sentences to Tokens, [received Jul. 15, 2024]. Retrieved from Internet:<https://arxiv.org/abs/1805.02214> (Year: 2018).*

* cited by examiner

```xml
<visit intent={book|modify|cancel|info}>
    <config intent={requested|proposed|accepted|available|rejected|unavailable|booked|current|cancelled}>
        <location intent={include|exclude}>
            <city value={palo alto|...}></city>
            <zipcode value={94304|...}></zipcode>
            <street value={castro|...}></street>
            <state value={CA|...}></state>
            <region value={bay area|...}></region>
        </location>

<time intent={include|exclude}>
            <year value={...|2016|2017|2018|...}></year>
            <month value={jan|feb|mar|apr|may|jun|jul|aug|sep|oct|nov|dec}></month>
            <week value={1|2|...|52}></week>
            <dayOfMonth value={1|2|...|31}></dayOfMonth>
            <dayOfWeek value={mon|tue|wed|thu|fri|sat|sun}></dayOfWeek>
            <hourMinute value={hourMinute}></hourMinute>
            <amPm value={am|pm}></amPm>
            <timezone value={timezone}></timezone>
        </time>

<client>
            <name value={name}></name>
            <phone value={phone}></phone>
            <gender value={male|female}></gender>
            <relationToCaller value={self|daughter|...}></relationToCaller>
            <ccOnFile value=yes|no></ccOnFile>
            <staff intent={include|exclude}>
                <name value={name}></name>
                <gender value={male|female}></gender>
                <speciality value={male|female}></speciality>
            </staff>
            <services intent={include|exclude}>
                <name value={service_name}></name>
                <category value={service_category}></category>
            </services>
        </client>

</config>

</visit>
```

Is George free for a color today ? Oh and my daughter
$\underbrace{\phantom{George}}_{Staff\_Name\ (include)}$ $\underbrace{\phantom{color}}_{Service\_Name(include)}$ $\underbrace{\phantom{today}}_{DayOfWeek\ (include)}$ $\underbrace{\phantom{my\ daughter}}_{User\_Relation}$ would like a trim
$\underbrace{\phantom{trim}}_{Service\ (include)}$

Is George free for a color today ? Oh and my
{Visit 1 (Book)} {Visit 1 (Book)} {Visit 1 (Book)} daughter would like a trim
{Visit 1 (Book)} {Visit 1 (Book)}

| Sentence Labelling |||||||
|---|---|---|---|---|---|---|
| Token | First Pass | Second Pass | Third Pass | Fourth Pass | Fifth Pass | Sixth Pass |
| Is | - | - | - | - | - | - |
| George | Book | - | Config 1 | Client 1 | - | - |
| free | - | - | - | - | - | - |
| for | - | - | - | - | - | - |
| a | - | - | - | - | - | - |
| color | Book | - | Config 1 | Client 1 | - | - |
| today | Book | - | Config 1 | Client 1 | Client 2 | - |
| ? | - | - | - | - | - | - |
| Oh | - | - | - | - | - | - |
| and | - | - | - | - | - | - |
| my | - | - | - | - | - | - |
| daughter | Book | - | Config 1 | - | Client 2 | - |
| would | - | - | - | - | - | - |
| like | - | - | - | - | - | - |
| a | - | - | - | - | - | - |
| trim | Book | - | Config 1 | - | Client 2 | - |

VIRTUAL BUSINESS ASSISTANT AI ENGINE FOR MULTIPOINT COMMUNICATION

CLAIM OF PRIORITY

This application claims priority to, is a continuation-in-part of and incorporates herein with its entirety: U.S. patent application Ser. No. 16/917,882, filed 30 Jun. 2020 and titled VIRTUAL ASSISTANT AI ENGINE FOR MULTIPOINT COMMUNICATION. This provisional patent application is hereby incorporated by reference in its entirety.

U.S. patent application Ser. No. 16/917,882 claims priority to and incorporates herein with its entirety U.S. provisional application No. 62/869,160, filed Jul. 1, 2019, and titled VIRTUAL ASSISTANT AI ENGINE FOR MULTI-POINT COMMUNICATION. This provisional patent application is hereby incorporated by reference in its entirety.

BACKGROUND

Businesses need to communicate with customers for a variety of reasons ranging from customer support, to sales and marketing. IVR systems and (now, more recently) chatbots, have been used to automate some aspects of customer communication. However, these approaches offer narrow or limited functionality, covering only a small number of simple use cases, and they also lead to notoriously frustrating customer experiences. To effectively solve this problem, any solution must take into account the fact that multiple parties involved—customer, business staff, business owner/manager and the AI that is driving communication with the customer on behalf of the business. We present a Virtual Business Assistant powered by our groundbreaking MIDGO AI technology that automates multi-point communication, helping with not just automating communication with a customer but also effectively coordinating with the business staff and manager/owner regarding that customer. This approach delivers dramatic improvements in the level of automation together with significantly higher quality of customer experience.

SUMMARY OF THE INVENTION

A computerized method includes receiving a dialog session. The dialog session comprises a set of new inbound messages. The method feeds the dialog session into tokenizer. The method, with the tokenizer, generates a set of tokens by breaking the new inbound messages into a sequence of tokens. The method provides the tokens to a DAG frame labeler cascade. With the DAG frame labeler cascade, the method uses a sequence of tokens to generate a set of token labels. The method passes the token labels and tokens to an entity interpreter. With the entity interpreter, the method generates a DAG frame. With the DAG frame, the method outputs a structured information from a multiturn dialogue.

BRIEF DESCRIPTION OF THE DRAWINGS

FIG. 6 illustrates an example schema for a semantic frame, according to some embodiments.

FIGS. 7-10 illustrate examples of entity tagging and semantic frame extraction, according to some embodiments.

FIG. 11 illustrates an example table of a process of implementing a multi-pass hierarchical sequence framework, according to some embodiments.

Figure 1:
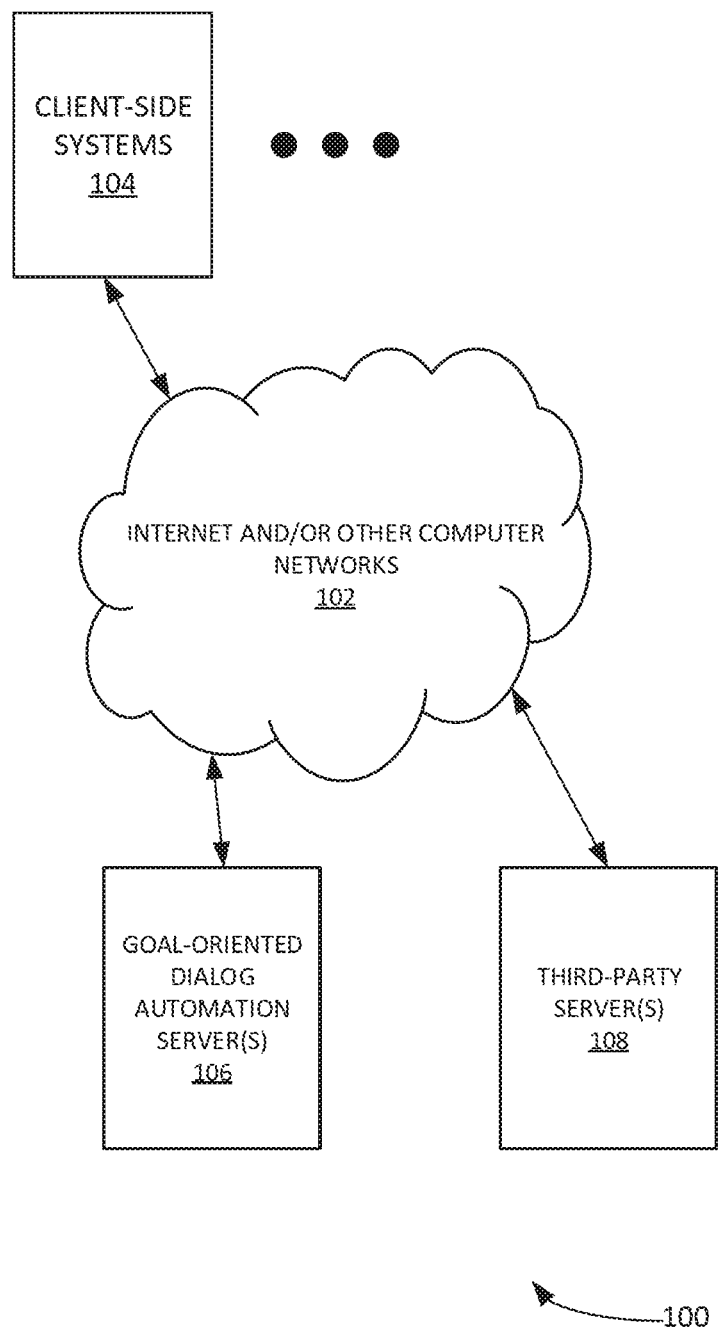
FIG. 1 illustrates an example of a goal-oriented dialog automation system, according to some embodiments.

The Figures described above are a representative set and are not exhaustive with respect to embodying the invention.

DESCRIPTION

Disclosed are a system, method, and article of manufacture for virtual business assistant AI engine for multipoint communication. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to 'one embodiment,' 'an embodiment,' 'one example,' or similar language means that a particular feature, structure, or characteristic described in connection with the embodiment is included in at least one embodiment of the present invention. Thus, appearances of the phrases 'in one embodiment,' 'in an embodiment,' and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Chatbot is a computer program or an artificial intelligence which conducts a conversation via auditory or textual methods.

Deep neural network (DNN) is an artificial neural network (ANN) with multiple layers between the input and output layers. The DNN finds the correct mathematical manipulation to turn the input into the output, whether it be a linear relationship or a non-linear relationship. The network moves through the layers calculating the probability of each output. For example, a DNN that is trained to recognize dog breeds will go over the given image and calculate the probability that the dog in the image is a certain breed. The user can review the results and select which probabilities the network should display (above a certain threshold, etc.) and return the proposed label.

Directed acyclic graph (DAG) is a finite directed graph with no directed cycles. It can include a finite number of vertices and edges. Each edge can be directed from one vertex to another, such that there is no way to start at any vertex v and follow a consistently-directed sequence of edges that eventually loops back to v again. A directed acyclic graph can be a directed graph that has a topological ordering, a sequence of the vertices such that every edge is directed from earlier to later in the sequence.

Enterprise resource planning (ERP) system can be a system for the integrated management of core business processes. It is noted that various business management software (BMS) systems can be used in lieu of an ERP system in some example embodiments here.

Escalation matrix allows a system to specify multiple contacts to be notified in the event of specified issues/triggers.

Long short-term memory (LSTM) units (or blocks) are a building unit for layers of a recurrent neural network (RNN). An RNN composed of LSTM units can be an LSTM network. A common LSTM unit is composed of a cell, an input gate, an output gate and a forget gate. The cell is responsible for remembering values over arbitrary time intervals.

Machine learning can include the construction and study of systems that can learn from data. Example machine learning techniques that can be used herein include, inter alia: decision tree learning, association rule learning, artificial neural networks, inductive logic programming, support vector machines, clustering, Bayesian networks, reinforcement learning, representation learning, similarity and metric learning, and/or sparse dictionary learning.

Recurrent neural networks are a class of artificial neural networks where connections between nodes form a directed graph along a temporal sequence. This allows it to exhibit temporal dynamic behavior. RNNs can use their internal state (memory) to process sequences of inputs. RNNs can model sequential data.

Semantic frame can be a collection of facts that specify characteristic features, attributes, and functions of a denotatum, and its characteristic interactions with things necessarily or typically associated with it. The semantic frame captures specific pieces of information that are relevant to summarizing and driving a goal-oriented conversation.

Tokenization can include the process of breaking a stream of text up into words, phrases, symbols, or other meaningful elements called tokens which represent the basic unit processed by the NLP system. The list of tokens becomes input for further processing such as parsing or text mining. Tokenization is the process of demarcating and/or classifying sections of a string of input. The resulting tokens can then be passed on to some other form of processing.

Example Computer Architecture and Systems

FIG. 1 illustrates an example of a goal-oriented dialog automation system 100, according to some embodiments. Users can use client-side systems (e.g. mobile devices, telephones, personal computers, etc.) to access the services of goal-oriented dialog servers 106 via input messages. Input messages can include, inter alia: voice messages, text messages, etc.

System 100 can include various computer and/or cellular data networks 102. Computer and/or cellular data networks 102 can include the Internet, cellular data networks, local area networks, enterprise networks, etc. Networks 102 can be used to communicate messages and/or other information from the various entities of system 100.

Goal-oriented dialog servers 106 can implement the various process of FIG. 4-13 Goal-oriented dialog servers 106 can obtain an input message at time t, mt, which is sent through a hierarchical sequence labelling based entity tagger (e.g. see entity tagging and semantic frame extraction embodiments and steps infra). The labelled message along with the tagged message context is then used by the semantic frame extractor (e.g. see entity tagging and semantic frame extraction embodiments and steps infra) which generates a semantic frame, Ft (see semantic frame implementations infra). The semantic frame can be a complete representation of the conversation till time t and, holds information about the specific entities being spoken about. Accordingly, the entities can be mapped to a standard name. This mapping can be implemented in an entity interpretation phase (see entity interpretation processes infra). The interpreted request can then be sent to the database to check whether it can be satisfied (e.g. to check if the business' schedule has availability for the requested services). The labelled message and tagged message context can also be sent to a response retrieval engine which ranks a universe of response templates. A response template can be/include a canonical response. The canonical response can capture the semantic nature of the sentence, while being completely agnostic to the values of the actual entities. For example, one potential template response could look like ⟨STAFF⟩ is available at ⟨TIME-HOURMIN⟩ at ⟨LOCATION⟩. This ranked list of candidate templates can then be passed to a candidate extractor whose task is to ensure that any responses going out of it are semantically consistent with the semantic frame and the availability returned by a relevant database (DB) if this is not in violation of any business rules. Examples of business rules can include, inter alia: requirement to provide a two-hour notice to book a massage; cannot cancel appointments with John with less than twenty-four hours of notice; etc. Based on the confidence scores of the entries in this filtered list of responses, the message can either directly send to the user, or is forwarded to an artificial intelligence (AI) trainer for manual verification (e.g. which provides relevance feedback and supervised data to retrain the retrieval engine, etc.). In addition to responding to messages sent by the user, the system allows for event-based triggers. These triggers may be rule based (for example, the workflow may require reminders to be sent to the user periodically) or based on the output of a classifier (e.g. in case a caller is becoming irate it might be prudent to pause the automated responses and forward the request to the concerned people). Each of these triggers can independently send the relevant notification to the smart notifier. The message can then be routed to either a specified user or a member of the business/staff. This framework can run in parallel with the response retrieval framework to provide a cohesive, end-to-end goal-oriented dialogue automation system. The subsequent sections capture details of the components described above along with a description of the techniques used.

Third-party servers 108 can be used to obtain various additional services. These services can include, inter alia: ranking systems, search-engines, language interpretation, natural language processing services, database management services, etc.

Figure 2:
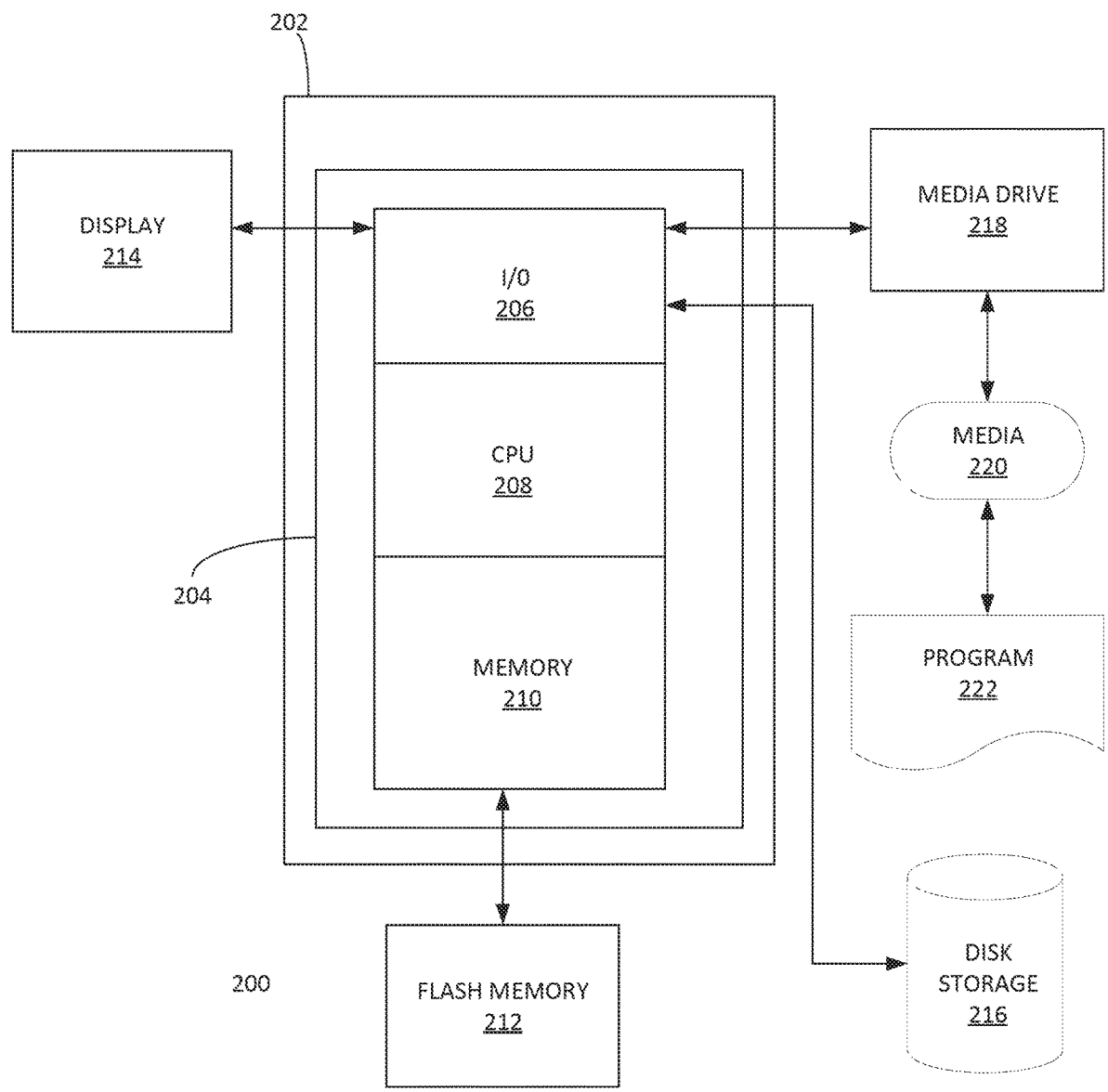
FIG. 2 depicts an exemplary computing system that can be configured to perform any one of the processes provided herein.

FIG. 2 depicts an exemplary computing system 200 that can be configured to perform any one of the processes provided herein. In this context, computing system 200 may include, for example, a processor, memory, storage, and I/O devices (e.g., monitor, keyboard, disk drive, Internet connection, etc.). However, computing system 200 may include circuitry or other specialized hardware for carrying out some or all aspects of the processes. In some operational settings, computing system 200 may be configured as a system that includes one or more units, each of which is configured to carry out some aspects of the processes either in software, hardware, or some combination thereof.

FIG. 2 depicts computing system 200 with a number of components that may be used to perform any of the processes described herein. The main system 202 includes a motherboard 204 having an I/O section 206, one or more central processing units (CPU) 208, and a memory section 210, which may have a flash memory card 212 related to it. The I/O section 206 can be connected to a display 214, a keyboard and/or other user input (not shown), a disk storage unit 216, and a media drive unit 218. The media drive unit 218 can read/write a computer-readable medium 220, which can contain programs 222 and/or data. Computing system 200 can include a web browser. Moreover, it is noted that computing system 200 can be configured to include additional systems in order to fulfill various functionalities. Computing system 200 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

Figure 3:
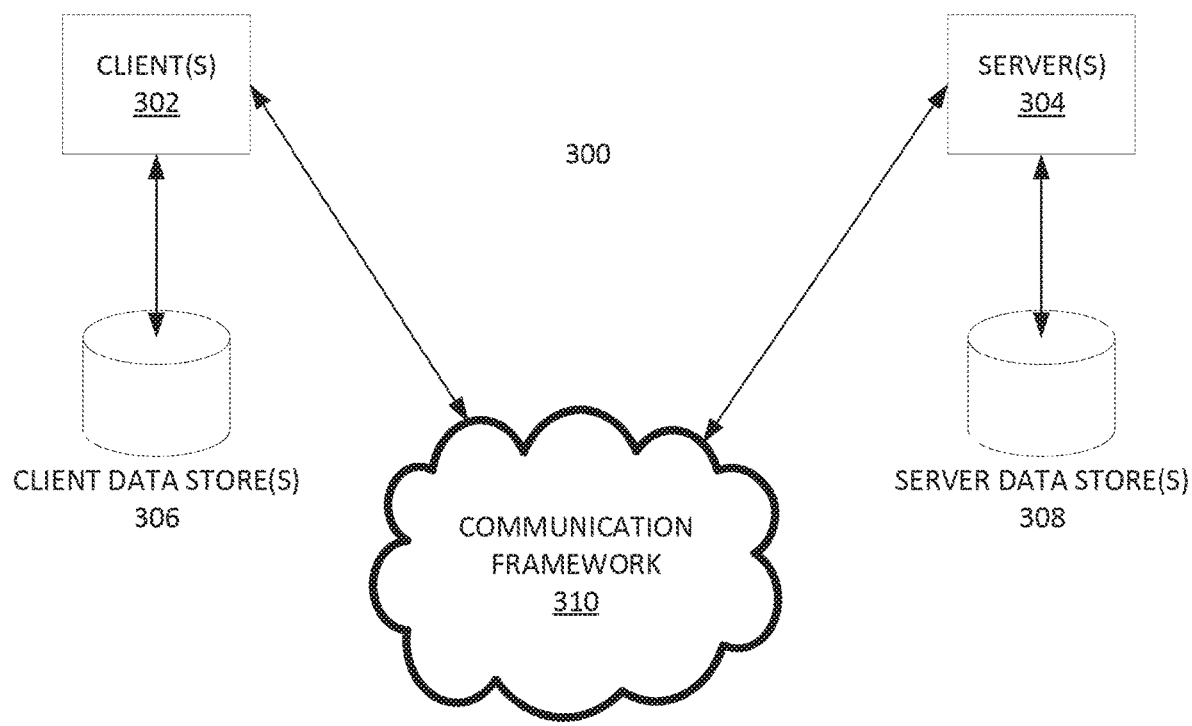
FIG. 3 is a block diagram of a sample computing environment that can be utilized to implement various embodiments.

FIG. 3 is a block diagram of a sample computing environment 300 that can be utilized to implement various embodiments. The system 300 further illustrates a system that includes one or more client(s) 302. The client(s) 302 can be hardware and/or software (e.g., threads, processes, computing devices). The system 300 also includes one or more server(s) 304. The server(s) 304 can also be hardware and/or software (e.g., threads, processes, computing devices). One possible communication between a client 302 and a server 304 may be in the form of a data packet adapted to be transmitted between two or more computer processes.

The system 300 includes a communication framework 310 that can be employed to facilitate communications between the client(s) 302 and the server(s) 304. The client(s) 302 are connected to one or more client data store(s) 306 that can be employed to store information local to the client(s) 302. Similarly, the server(s) 304 are connected to one or more server data store(s) 308 that can be employed to store information local to the server(s) 304. In some embodiments, system 300 can instead be a collection of remote computing services constituting a cloud-computing platform.

Exemplary Methods

Figure 4:
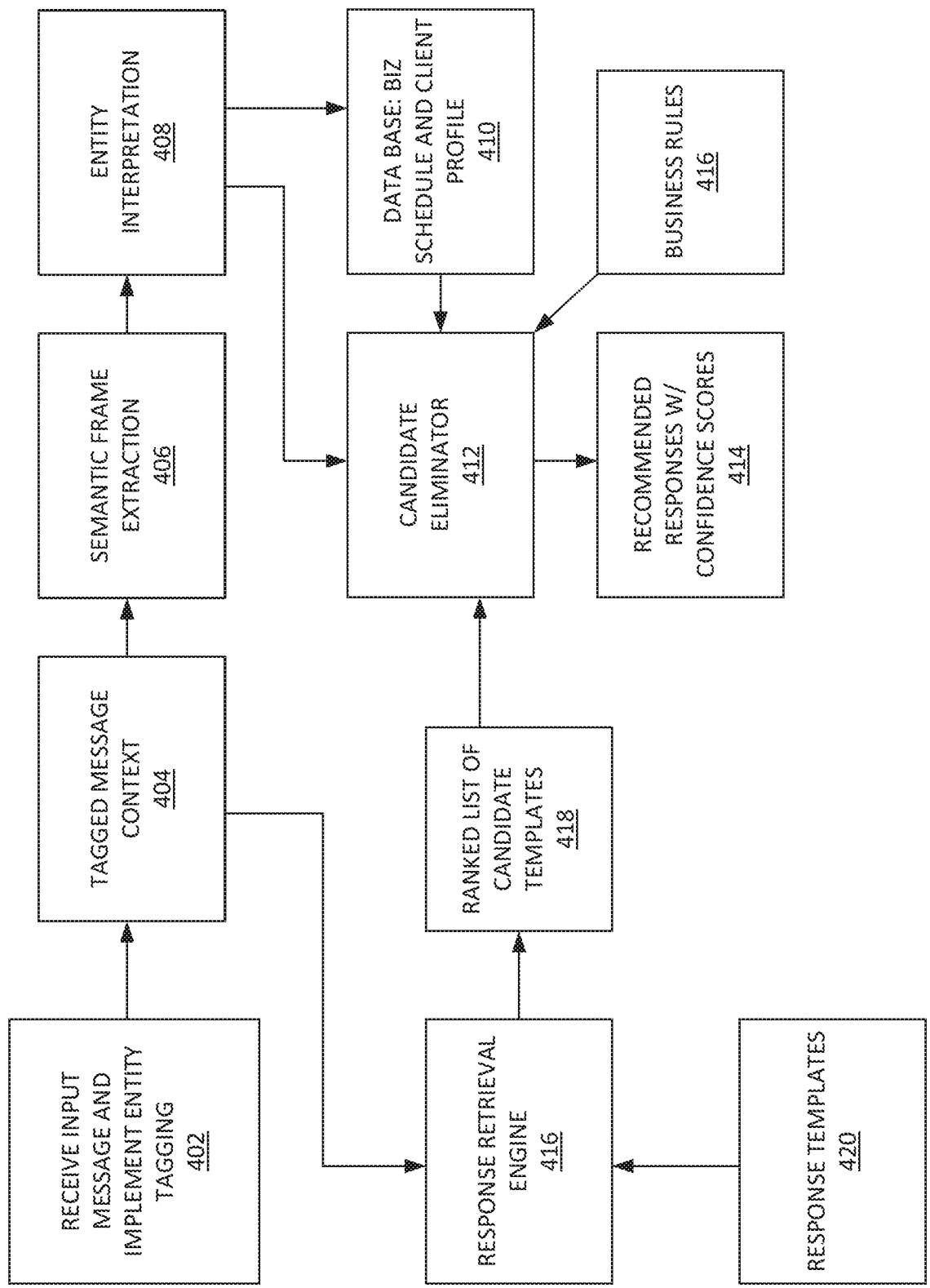
FIG. 4 illustrates an example response retrieval process for implementing a conversational agent, according to some embodiments.

FIG. 4 illustrates an example response retrieval process 400 for implementing a conversational agent, according to some embodiments. Example conversational agents can be based on response retrieval process 400. In step 402, framework 400 can receive input messages and implement entity tagging. In step 404, process 400 tags the message context. In step 406, process 400 can implement semantic frame extraction. In step 408, process 400 can implement entity interpretation. In step 410, process 400 can access a database to determine a business schedule and client profile. In step 412, process 400 can implement a candidate eliminator. Step 412 can incorporate use of business rules 416. In step 414, based on the output of step 412, process 400 can recommend responses with confidence scores 414.

Process 400 can also implement a response retrieval engine 416. Response retrieval engine 416 can obtain response templates 418. Response retrieval engine 416 can obtain a tagged message context. Process 400 can also implement a response retrieval engine 416. Response retrieval engine 416 can generate a ranked list of candidate templates 418 to candidate eliminator step 412.

Figure 5:
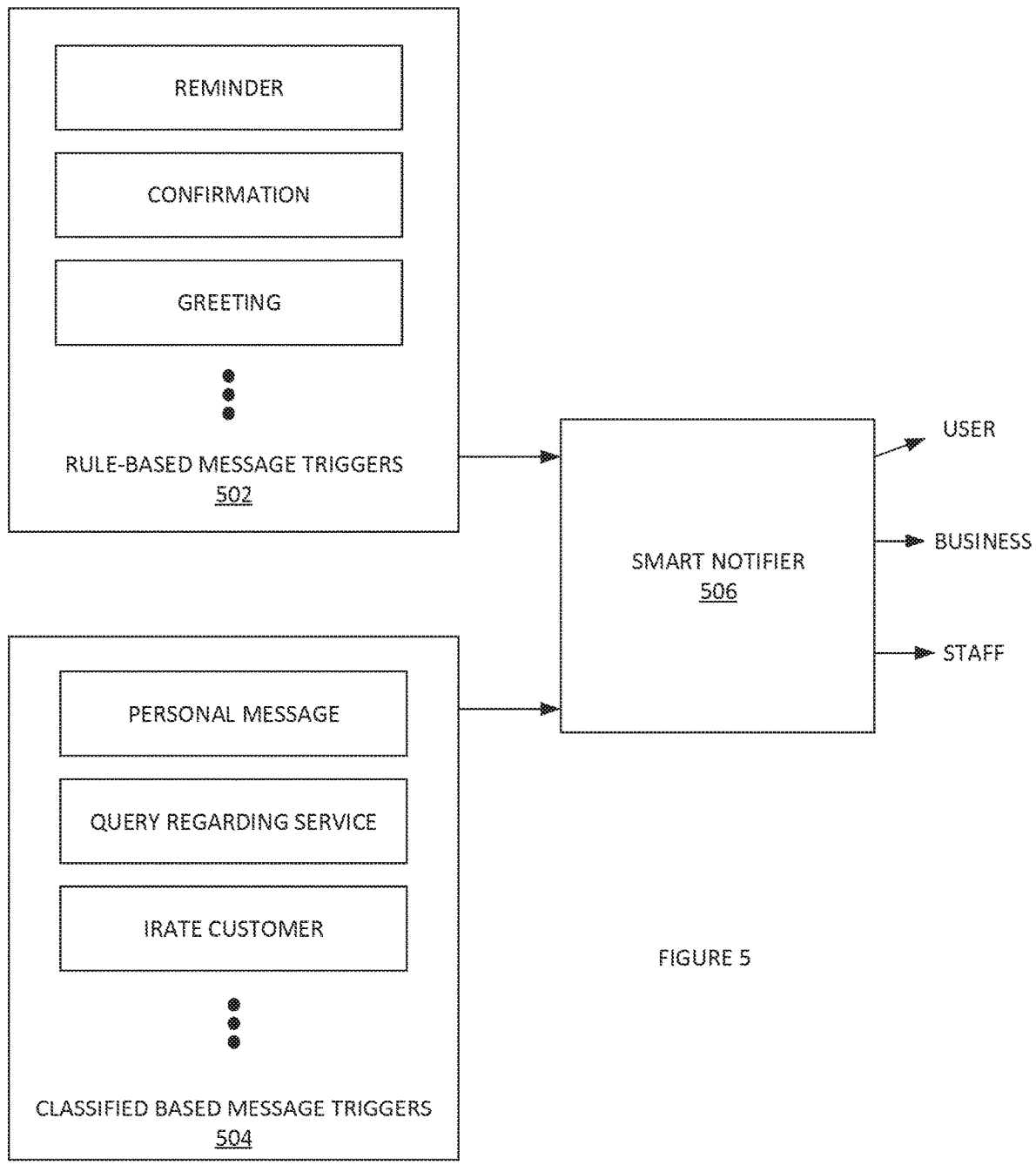
FIG. 5 illustrates an example smart notifier framework, according to some embodiments.
Figure 9:
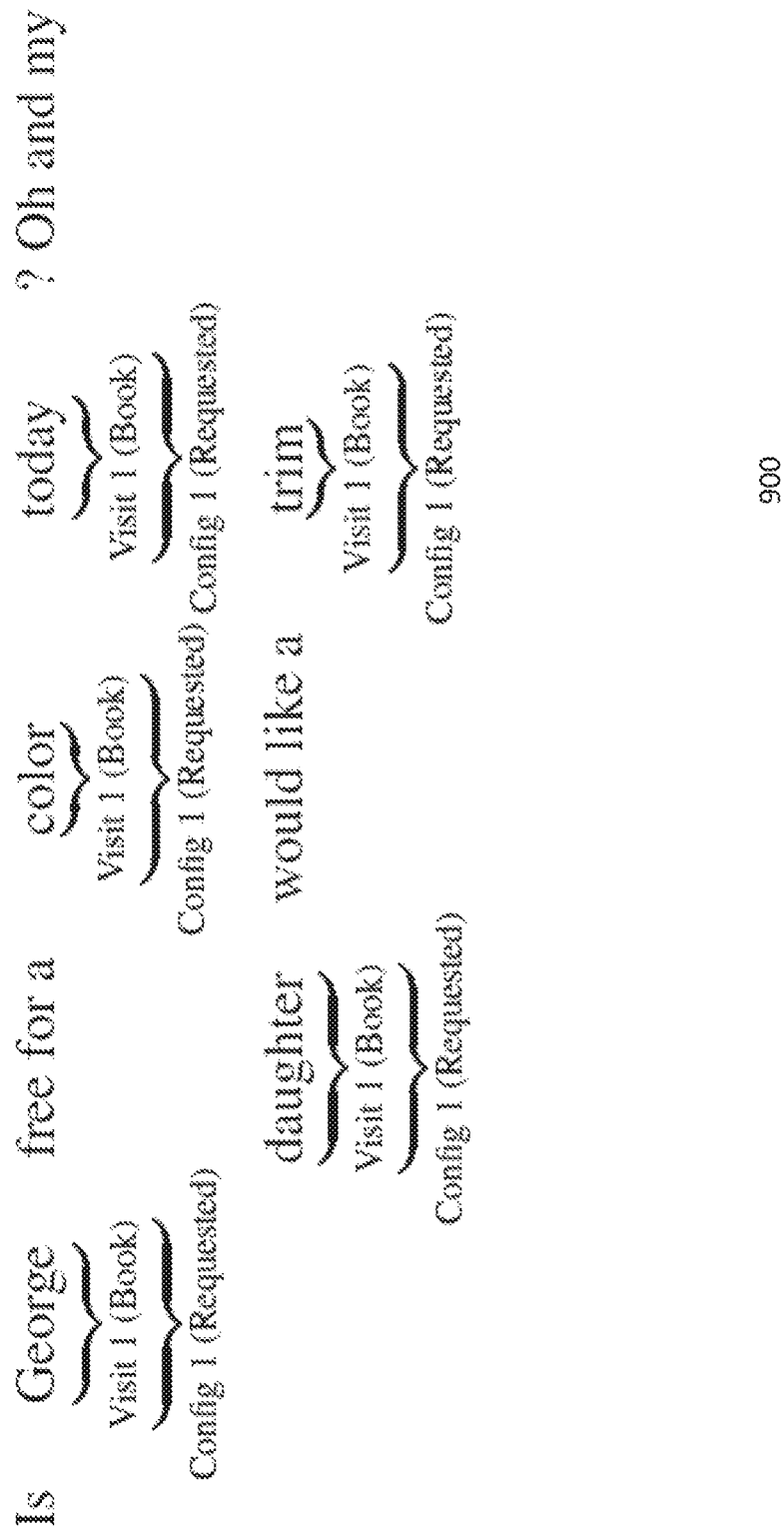

FIG. 5 illustrates an example smart notifier framework 500, according to some embodiments. Smart notifier framework 500 can run in parallel to the response retrieval framework of process 400. There can be two avenues by which an event may be triggered: rule-based message triggers 502 and/or classifier-based message triggers 504. Rule based triggers 502 can be independent of the state of a conversation. An event 'e' can be fired based upon the business information available and the client's profile (e.g. as provided in process 400 supra). For example, the event 'e' can bean event to remind the user to add their credit card details. 'e' can be triggered if the business requires a user's credit card to be on file, and each reminder event will check the user's profile to validate whether the details have been provided. Classifier based triggers 504 can be classifiers that depend upon an immediate dialogue text. There can be individual classifiers for each potential trigger. These classifiers can take as input the message 'mt' and output whether or not an event needs to be triggered and if so, to whom. These events can then trigger messages to the appropriate person (e.g. based upon the content of the event).

FIG. 6 illustrates an example schema for a semantic frame 600, according to some embodiments. A semantic frame can be used to express the structured information in a dialog session. In one example, the semantic frame for a dialogue 'Dt' can be denoted by 'Ft'. The semantic frame is updated with each new message that is sent and/or received in a session. A semantic frame can be a simple collection of slots along with an associated intent. Each slot can hold the value of an entity (e.g. a name, a phone number, date, etc.) and/or it can in-turn reference another frame (e.g. a client's profile, a booking request, etc.). In a fully instantiated semantic frame, its slots recursively resolve to a collection of entity values. FIG. 6 illustrates an example schema. While this example lists frames corresponding to the book, modify, cancel or info intents, the structure can be extended in other ways to address multiple intents (e.g. identification of spam calls, calls requiring immediate business attention, etc.). The semantic frame Ft for a dialog Dt can be visualized as a Directed Acyclic Graph, where each node is a frame (or sub-frame) and its child nodes are the corresponding slots in that frame. When a slot contains an entity value, it can become a leaf node. In another example, the graph can become deeper by one more level to represent another sub-frame. Nodes in the graph can be labelled by the type of the frame (or slot) that it represents. When there are multiple nodes of the same type and at the same level, they are numbered in order to assign each of them a unique label. Edges in the graph can be labelled with an intent, that qualifies the relationship between the nodes that it connects.

FIGS. 7-10 illustrate examples of entity tagging and semantic frame extraction, according to some embodiments. Structure (e.g. semantic frames) from a conversation dialog can reduce to labelling the sequence of text tokens that constitute it. Any set of one or more tokens in the dialog (e.g. contiguous or otherwise, within a single utterance or across multiple utterances) can be assigned a label. The tokens in a dialog that constitute a frame (and/or sub-frame) are assigned the label obtained by the concatenation of the frame-type (or slot-type) and its associated intent (if one exists). Hierarchical sequence labelling can be used to infer frames from conversational dialog. At the most granular level, the tokens can be tagged as belonging to one of the leaf nodes of the graph along with their corresponding intents.

More specifically, FIG. 7 illustrates an example tagging of an example sentence:

m1: 'Is George free for a color today? Oh and my daughter would like a trim'.

Figure 10:
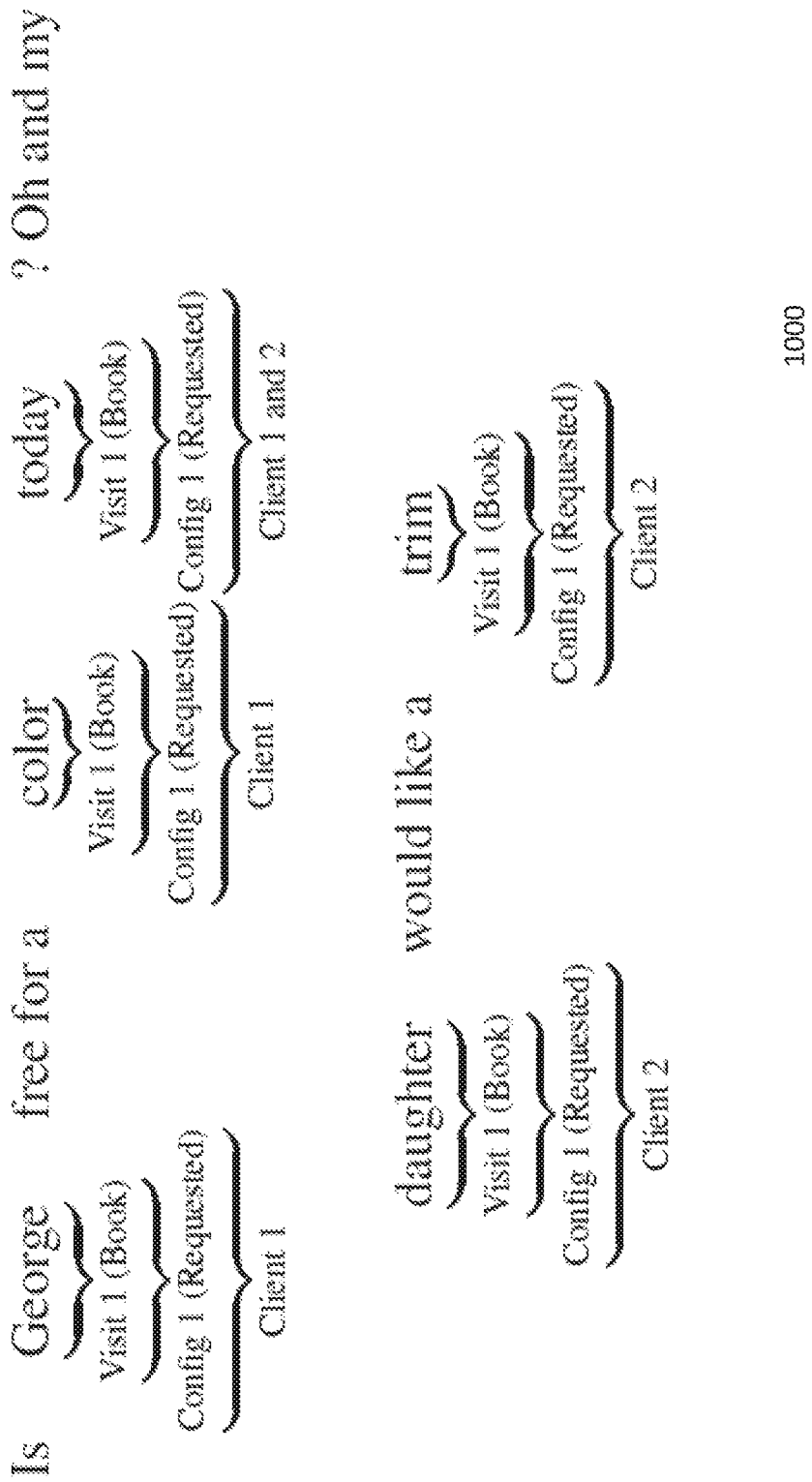

The process shown in FIG. 7 provides a set of entity labels. To extract actionable information from the conversation, additional information about the association between these entities can be obtained. For example, it can be determined which person required the color service and who needed the haircut. In order to capture this multiplicity of configurations, a multi-pass hierarchical sequence framework can be generated. The sentence of FIG. 7 can be first passed through the multi-pass hierarchical sequence framework in order to tag the entities at the highest level in the graphical representation of the semantic frame to generate the content of FIG. 8. A second pass over the sentence can reveal no new visits in the conversation and would thus proceed to the next hierarchical level in the graph—configurations, as provided in FIG. 9. The next pass can once again reveal no new configurations, and the process can proceed to the next level—client. As shown in FIG. 10, labels can be obtained for both the first and the second pass since there are two clients being spoken of. Thus, each pass captures the key information in a dynamically evolving hierarchy of semantic frames. While there is a regularity to the structure of the evolving hierarchy, the size and shape of the directed acyclic graphs changes dynamically as the conversation proceeds. It is noted that if no labels are assigned for a particular pass, the process proceeds to a next level in the hierarchy of the multi-pass hierarchical sequence framework until the leaf nodes are reached.

FIG. 11 illustrates an example table 700 of a process of implementing a multi-pass hierarchical sequence framework, according to some embodiments. Table 700 illustrates the sequential nature of the multi-pass hierarchical sequence framework process.

Figure 12:
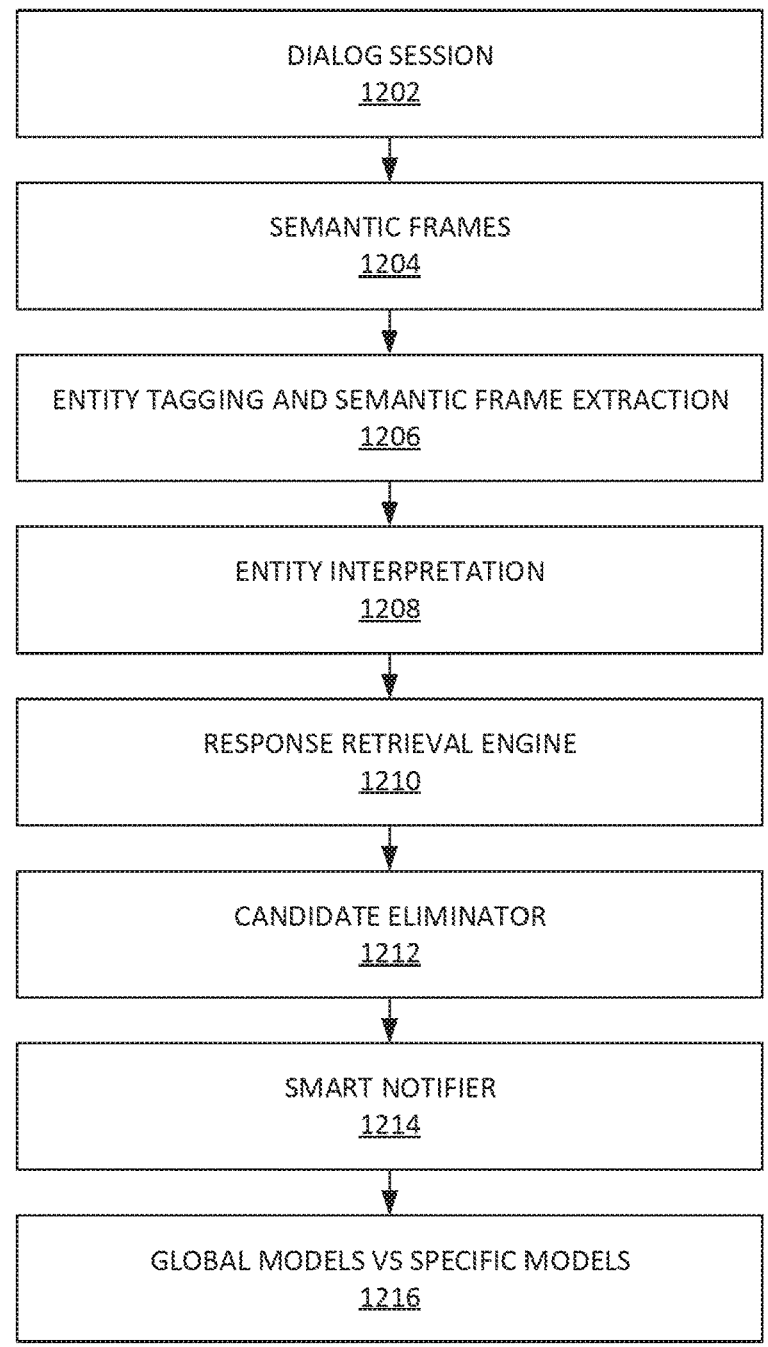
FIG. 12 illustrates an example process for implementing goal-oriented dialog automation, according to some embodiments.

FIG. 12 illustrates an example process for implementing goal-oriented dialog automation, according to some embodiments. In step 1202, process 1200 can implement a dialog session. The dialog session can comprise a set of utterances or messages. The dialog session can be in a computer-readable format and obtained from voice message, text message, electronic mail content, etc.

In step 1204, process 1200 can implement semantic frames. Additional information for implementing semantic frames is provided herein.

In step 1206, process 1200 can implement entity tagging and semantic frame extraction. Step 1206 can provide a set of tokens in a dialog that constitute a frame (or sub-frame) which are assigned the label obtained by the concatenation of the frame-type (or slot-type) and its associated intent (if one exists). Hierarchical sequence labelling can be used to infer frames from conversation/message(s).

In step 1208, process 1200 implements entity interpretation. During frame inference, one or more tokens may be assigned to a particular slot as its value. For example, a pair of successive tokens, 'men's haircut', may be inferred as a 'requested service'. In order to interpret the request, the slot value can be mapped into appropriate entries in the database. This mapping can be easy if there is an exact match of the slot value with the corresponding service(s) in the database. However, in some examples, this may not be the case. The slot may contain misspelled words, acronyms, common (and/or uncommon) alternative ways to reference a service, etc. In some examples, a single-token slot value can map to multiple database (DB) entries, and at other times, multiple-token slot values may map to a single DB entry. A learning model can be applied. For example, let v denote the slot-value that needs to be mapped. Let C denote a list of candidate DB entries that v can be mapped into. For each c∈C, process 1200 can construct a feature vector f(v; c) that measures various aspects of v and c individually, as well as the extent of match between v and c. Process 1200 can then learn a ranker that takes the set $\{f(v; c): c \in C\}$ as inputs and outputs the most relevant entries in the database that v can map into, along with their corresponding confidence scores. This sorted list can then be used to interpret the request for further processing.

In step 1210, process 1200 can implement a response retrieval engine. For example, let $M=\{m1, m2, \ldots, m_{|R|}\}$ denote the universe of message templates from which a response must be chosen. Process 1200 can implement a dialog session 'Dt', with its most recent utterance 'ut'. The response generator takes the utterance 'ut' and the broader context Dt as input and generates a response ut+1. Process 1200 can implement a retrieval framework for the response generator that computes a rank-score $\xi(D_t, m_i) \in \mathbb{R}$ for every $m_i \in \mathcal{M}$. The rank-score is computed using an LSTM-based encoder-decoder architecture with a hierarchical attention mechanism.

The retrieval framework returns a rank-score sorted list of top-k responses to the response generator. Training the ranker is posed as a supervised learning problem. The more frequently a given message $m \in \mathcal{M}$ is used for an input context of Dt or similar, the higher the rank-score can be for that message. In this way, process 1200 can provide a data-driven framework to learn the best response for a given context that uses relevance feedback and that scales with more and more real conversational data. Situations arise which render a single global response retrieval engine across all businesses restrictive and process 1200 can implement step 1216 accordingly (see infra).

In step 1212, process 1200 can implement a candidate eliminator. An example candidate eliminator process is now discussed. For example, $M_t = \{m_{i_1}, m_{i_2}, \ldots, m_{i_3}\}$ can denote the rank-sorted list of top-k response-templates returned by the retrieval engine for the input context Dt. Not all response-templates may be valid for use in the current context. For example, mi1 may be meant to recommend availabilities, but as per the schedule, there may actually be none. The candidate eliminator runs down this list and returns only those responses which are valid given the current state of the semantic frame and database.

In step 1214, process 1200 can implement a smart notifier. As noted, this portion of the pipeline can run in parallel to the response retrieval framework described herein. There are two avenues by which an event may be triggered.

In a first example, rule-based triggers can be implemented. In a second example, classifier-based triggers can be implemented. These classifiers can depend upon the immediate dialogue text. There can be individual classifiers for each potential trigger and these classifiers take as input the full session context Dt and any new incoming message and output whether or not an event needs to be triggered and if so, to whom. These events then trigger messages to the appropriate person (e.g. based upon the content of the event).

In step 1216, process 1200 can implement global models and/or specific models. For example, a business may have certain response templates which occur frequently in conversation but are not applicable to other businesses. Having a single universe of response templates across businesses does not cater to these scenarios and stifles the organic development of the system. Two bags of response templates can be utilized. One bag of response templates can be a global bag of response templates. Another bag of response templates can be a business specific bag of response templates. As noted, on receipt of a user utterance 'ut' and a dialogue context 'Dt', then each message $m_i$ in the global response templates can be given a score global $\xi^{global}(D_t, m_i) \in \mathbb{R}$. Additionally, another model can independently ascribe the business specific templates to a score business $\xi^{business}(D_t, m_i) \in \mathbb{R}$. These two scored lists of responses can be sent to the candidate eliminator for filtering.

Figure 13:
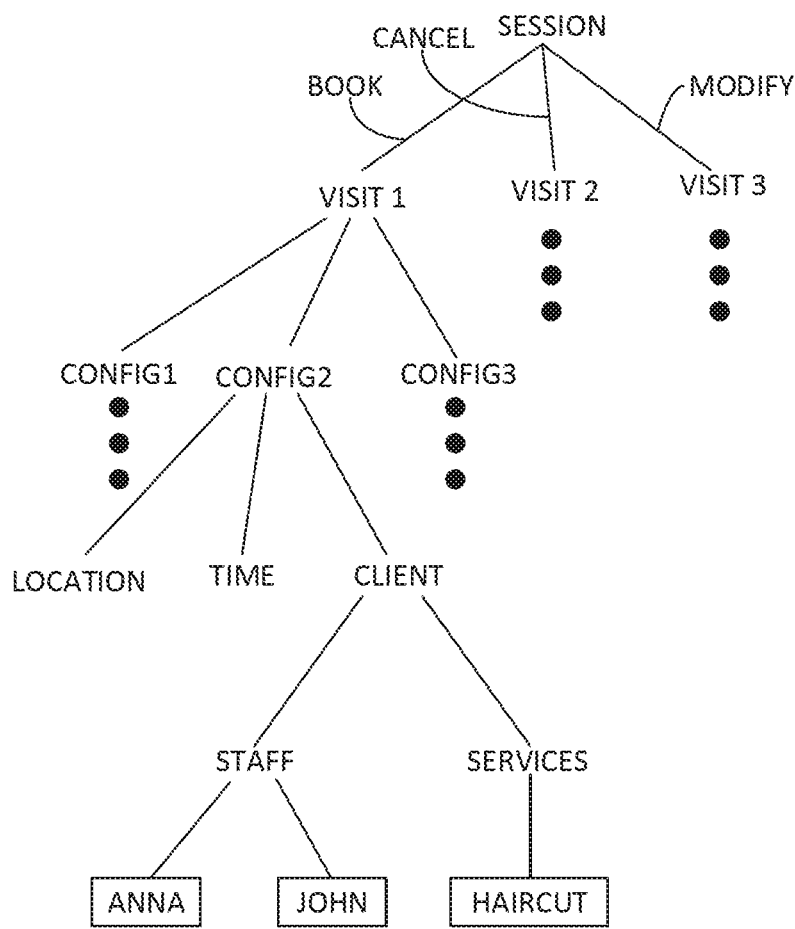
FIG. 13 illustrates an example semantic frame as a directed acyclic graph, according to some embodiments.

FIG. 13 illustrates an example semantic frame as a directed acyclic graph 1300, according to some embodiments. Directed acyclic graph 1300 is a graphical representation of the semantic frame examples discussed supra. Directed acyclic graph 1300 includes hierarchical levels as shown. Process 1200 tags tokens of the input message as belonging to a relevant leaf node(s) of directed acyclic graph 1300 along with their corresponding intents. FIGS. 7-10 illustrate the passing of an input message through the illustrated hierarchical levels and the resulting output.

Figure 14:
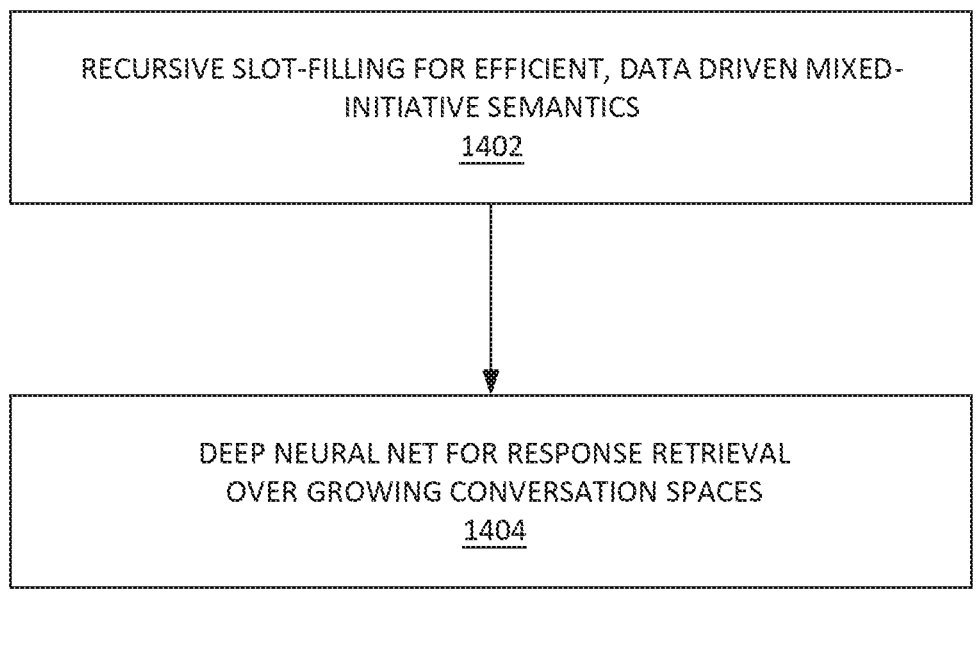
FIG. 14 illustrates an example process for implementing a hybrid neural model for a conversational AI first solution that successfully combines goal-orientation and chat-bots, according to some embodiments.

FIG. 14 illustrates an example process for implementing a hybrid neural model for a conversational AI first solution that successfully combines goal-orientation and chat-bots, according to some embodiments. In step 1402, process 1400 implements a recursive slot-filling for efficient, data driven mixed-initiative semantics. In step 1404, process 1400 implements a deep neural network for response retrieval over growing conversation spaces.

Additional Embodiments

Figure 15:
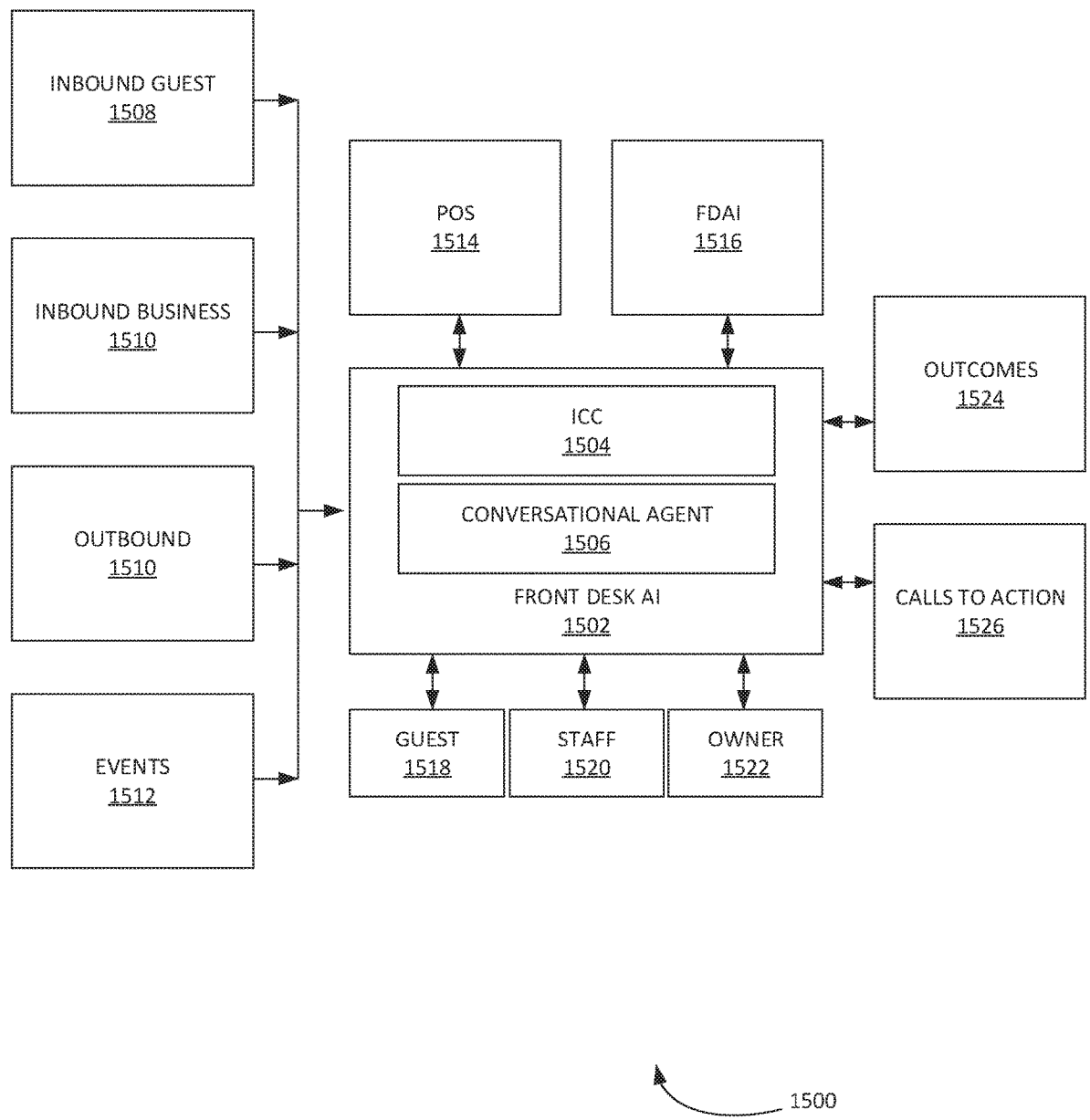
FIG. 15 illustrates an example system for implementing a virtual business assistant AI engine 1502, according to some embodiments.

FIG. 15 illustrates an example system 1500 for implementing a virtual business assistant AI engine 1502, according to some embodiments. System 1500 includes virtual business assistant AI engine 1502. Virtual business assistant AI engine 1502 provides a complete virtual business assistant and preserves a human-like touch. The virtual business assistant can be simple to on-board, use, and teach over time. Virtual business assistant AI engine 1502 includes an intelligent control center (ICC) 1504. ICC 1504 can generate outcomes 1524 and calls to action 1526. ICC 1504 can use machine learning algorithms. ICC 1504 can summarize outcomes 1524 of the caller's interactions with the virtual business assistant and can recommend the calls to action 1526. ICC 1504 can use machine learning algorithms. Outcomes 1524 can include, inter alia: new appointments, membership requirements, provided information, timeliness states (e.g. running late, early, etc.), insufficient information, unresponsive status, etc. There can be one or more outcomes 1524 for a particular virtual-assistant conversation.

A second category of output can be a call to action 1525. Calls to action 1526 can be an additional action that remains pending after the virtual business assistant AI engine 1502 provides an answer and/or determines a set of outcomes. Calls to action 1526 can include, inter alia: call client back, provide information, collect payment information, cancel booking, etc. These can be forwarded to an appropriate entity (e.g. staff, owner, third-party service provider, etc.). It is noted that virtual business assistant AI engine 1502 can use prediction methods to determine outcomes 1524 and/or calls to action 1526. In this way, virtual business assistant AI engine 1502 extends the functionality of a chat bot to a full front-desk communication automation system that uses the conversation AI engine based on mixed initiative dialog with goal orientation (MIDGO) technology. Virtual business assistant AI engine 1502 can take a variety of triggers and subsequent conversation content as an input and intelligently determine a variety of outcomes 1524 and/or calls to action 1526 to be delivered as output. Virtual business assistant AI engine 1502 can utilize a proprietary data store to augment BMS 1514 of the business/enterprise.

Virtual business assistant AI engine 1502 includes a conversation agent 1506. Conversation agent 1506 is a computer system intended to converse with a human with a coherent structure. Dialogue systems have employed text, speech, graphics, haptics, gestures, and other modes for communication on both the input and output channel. Conversation agent 1506 can implement a MIDGO AI module (e.g. FDAI 1526, etc.). Conversation agent 1506 can recognize when to initiate conversations and when to respond. Based on what events occurs during the conversation, conversation agent 1506 can determine which messages should be generated and sent to either a business owner and/or staff (e.g. regarding a specific issue such as an imminent appointment cancellation, scenarios that require immediate attention, a client is locked out of a building, etc.). Conversation agent 1506 can facilitate an automatic communication between the guest/customer and the staff/owner when virtual business assistant AI engine 1502 such a scenario. In this way, virtual business assistant AI engine 1502 can implement a multipoint communication system between users 1518, staff 1520, owners 1522, etc. and conversation agent 1506. Virtual business assistant AI engine 1502 can manage a plurality of conversational goals within the multipoint system as multiple-related conversations occur. A plurality of outcomes can emerge from a single initial conversation, these can be managed to determine outcomes 1524 and calls to action 1526.

Virtual business assistant AI engine 1502 can initiate natural-language conversations with users (e.g. customers, business/enterprise employees, third-party suppliers, etc.) based on triggers 1508-1516. Triggers 1508-1516 can include, inter alia: inbound customer/guest trigger(s) 1508, inbound business trigger(s) 1510, outbound trigger(s) 1512, event trigger(s) 1514, etc. Inbound customer/guest trigger(s) 1508 can include, inter alia: missed calls, voicemails, direct text messages, web chats, etc. Triggers can be initiated by users 1518, staff 1520, owners 1522, etc.

Virtual business assistant AI engine 1502 can integrate with various business management software (BMS) 1514. BMS 1514 can include, inter alia: point a sale, an ERP system, etc. BMS 1514 can include any system a business/enterprise uses to run day to day operations and can be a book of record for appointments/orders for the business/enterprise. Virtual business assistant AI engine 1502 can use this BMS 1514 to access business information (e.g. open times/schedules, products/services available, time to fulfillment, cost structures, etc.). Virtual business assistant AI engine 1502 can access via an API. Virtual business assistant AI engine 1502 can query BMS 1514 for data and setting up appointments, etc. Virtual business assistant AI engine 1502 can augment information in BMS 1514 with other data sources (e.g. cancellation policy, alternative recommendations based on user queries, expose additional service names if new scenarios are presented, etc.) without exposing a different service name. In this way, virtual business assistant AI engine 1502 can fill in any gaps in the booking software, FAQs, business rules, etc. of the business/enterprise in a seamless manner. Virtual business assistant AI engine 1502 can store and analyze incoming queries and use these to supplement the functionalities of BMS 1514. Virtual business assistant AI engine 1502 can use FDAI 1516 to implement this extension of the various BMS functionalities.

FDAI 1516 can be a third-party automated assistant solution provider. FDAI 1516 can write dynamic augmenting information back into and add to the BMS functionalities. In this way, FDAI 1516 can update and supplement virtual business assistant AI engine 1502 and BMS 1514 to adapt to the content of triggers, etc.

It is noted that there are two parts for the artificial intelligence functionalities, including, inter alia: comprehending incoming text and responding to said incoming text. The AI functionalities can automatically infer from conversation to predict calls to actions and update BMS based on call to action as an outcome from conversation. In other words, a first part includes the ability to comprehend caller's requests and suitably respond in natural language. A second part is the ability to summarize the outcomes from such interactions, push updates or changes to the BMS and the augmented business information database, and recommend relevant calls to action for the business.

Figure 16:
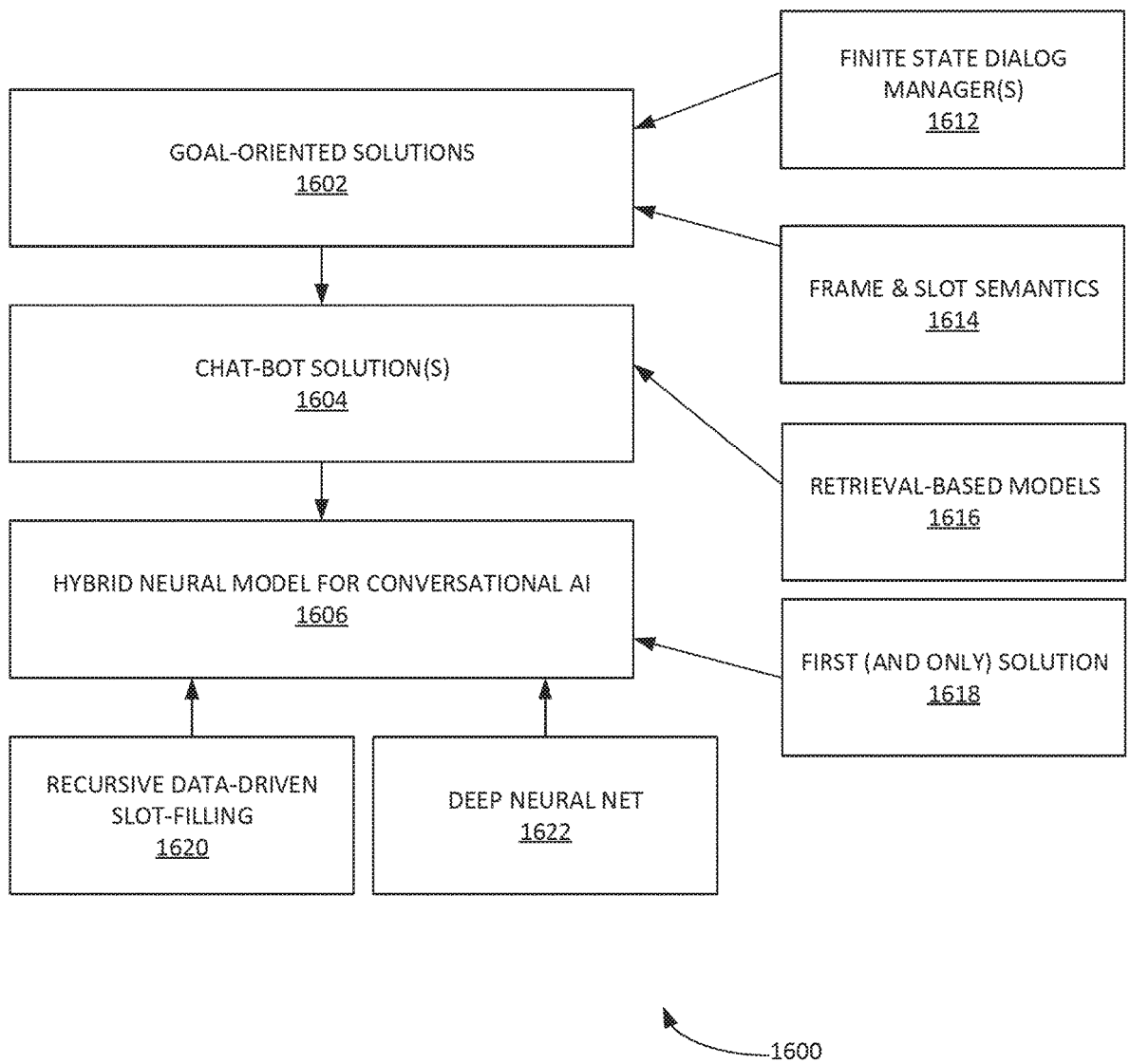
FIG. 16 illustrates an example process for implementing a virtual business assistant AI engine, according to some embodiments.

FIG. 16 illustrates an example process 1600 for implementing a virtual business assistant AI engine, according to some embodiments. In step 1602, process 1600 can obtain goal-oriented solutions (e.g. book airline tickets, take orders in retail, etc.). Goal-oriented solutions can include complete pre-defined tasks/goals. Step 1602 can utilize finite-state dialog manager(s) 1612 and/or frame and slot semantics 1614. Finite-state dialog manager(s) 1612 can include single initiative and/or universals. Frame and slot semantics 1614 can include crafted patterns.

In step 1604, process 1600 can implement chat-bot solutions. Chat-bot solutions can use retrieval-based models. Chat-bot solutions can include, inter alia: learn over large data sets, may not be goal-oriented (e.g. no task completion), and implement shallow conversations.

In step 1606, process 1600 can implement a hybrid neural model for conversational AI. Hybrid neural model for conversational AI can implement: a first (and only) solution that combines goal-orientation and chat-bots; recursive data-driven slot-filling for mixed-initiative semantics 1620; and deep neural net 1622 for response retrieval over growing conversation spaces.

Figure 17:
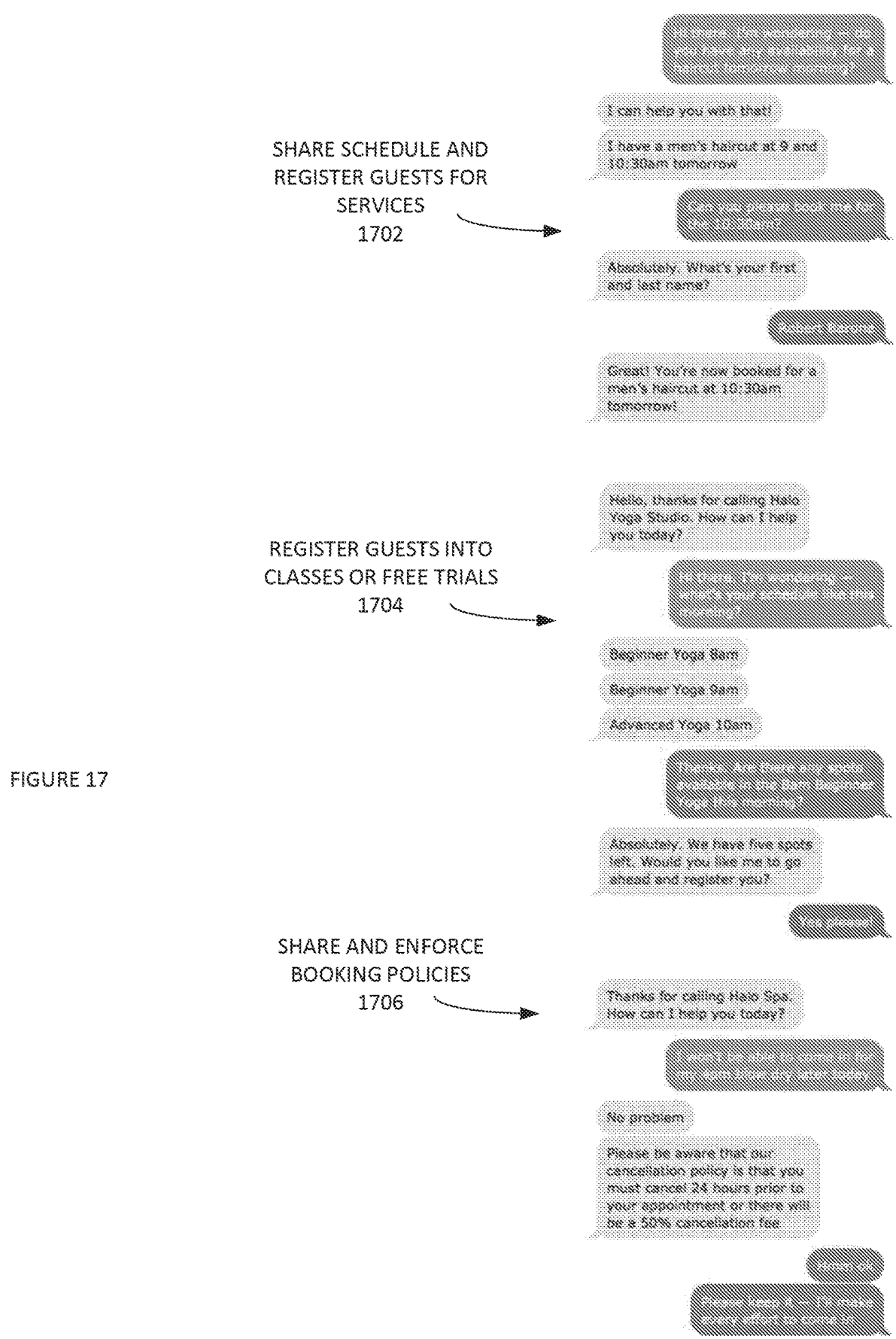
FIG. 17 illustrates an example process for managing a guest interaction, according to some embodiments.

FIG. 17 illustrates an example process 1700 for managing a guest interaction, according to some embodiments. In step 1702, process 1700 can Share schedule and register guests for services. In step 1704, process 1700 can register guests into classes or free trials. In step 1706, process 1700 can share and enforce booking policies.

Figure 18:
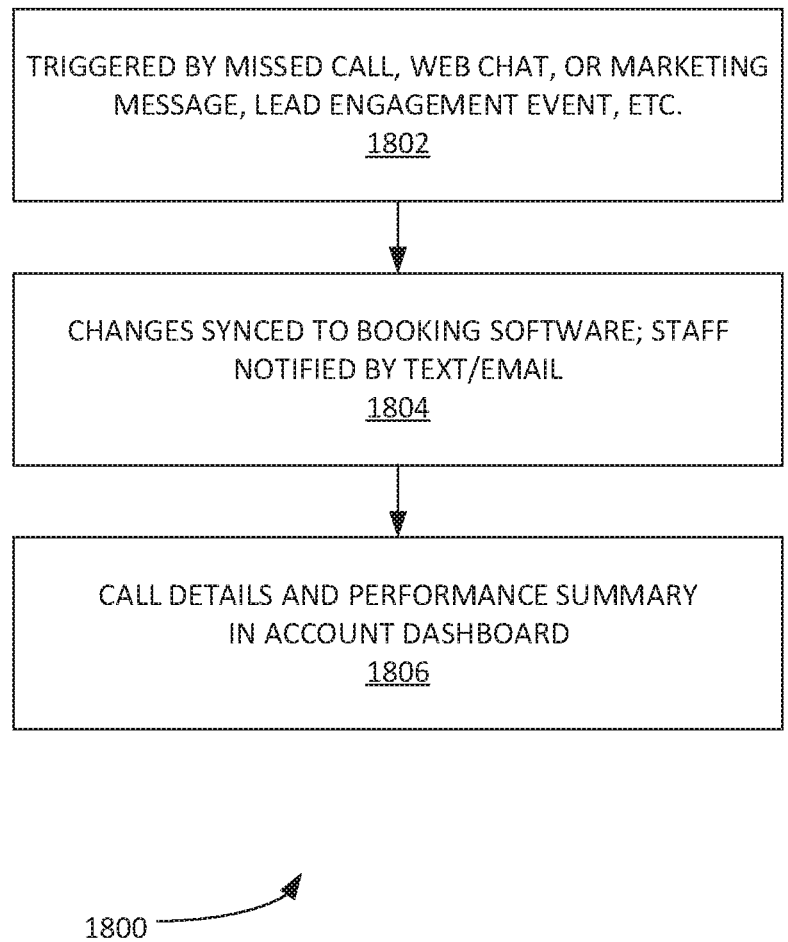
FIG. 18 illustrates an example process for implementing a virtual business assistant AI engine, according to some embodiments.

FIG. 18 illustrates an example process 1800 for implementing a virtual business assistant AI engine, according to some embodiments. In step 1802, process 1800 can be triggered by missed call, web chat, or marketing message, etc. In step 1804, process 1800 can implement changes synced to booking software and the STAFF can be notified by text/email. In step 1806, process 1800 can implement call details and performance summary in account dashboard.

Figure 19:
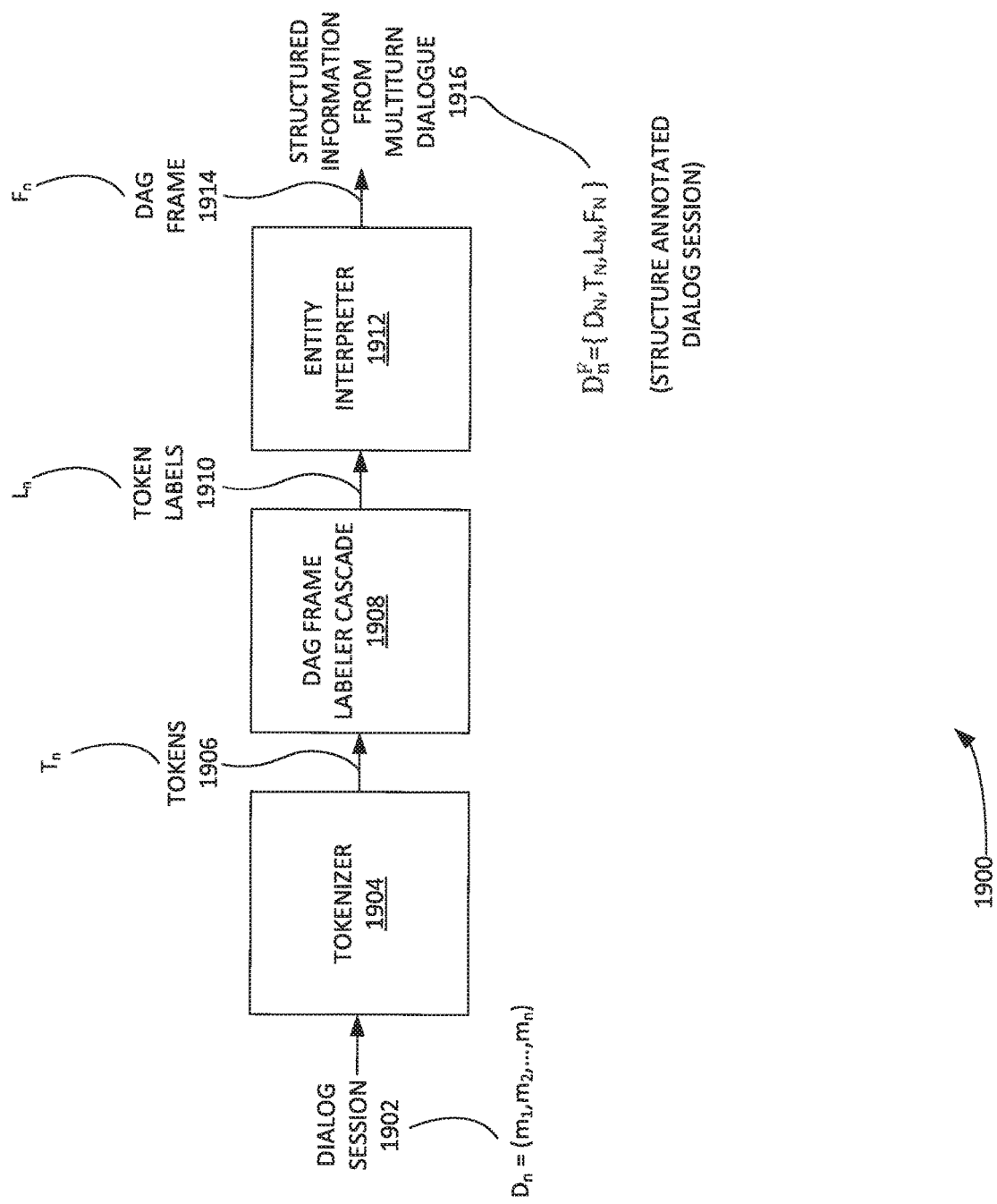
FIG. 19 illustrates an example process for implementing a DAG frame, according to some embodiments.

FIG. 19 illustrates an example system 1900 for implementing a DAG frame, according to some embodiments. The DAG frame can be a MIDGO AI semantic frame. System 1900 describes how a dialog session (e.g. a sequence of messages, etc.) is received as input. The sequence of messages can be an exchange of messages. This can include messages from a customer to a system (e.g. AI-based business assistant 2300, etc.) and messages from the system to a customer and/or other relevant entities. The output of system 1900 can be a DAG frame (e.g. see infra). System 1900 may not need to pass the messages through a deep NLP model.

Process 1900 can receive a dialog session 1902. Herein, dialog session 1902 is represented as: $D_n=(m_1, m_2, \ldots, m_n)$. $m_n$ is a new inbound message. Dialog session 1902 is fed to tokenizer 1904. Tokenizer 1904 generates tokens 1906, $T_n$, from $D_n=(m_1, m_2, \ldots, m_n)$ by breaking the messages into a sequence of tokens. Tokens 1906, $T_n$, are then provided to DAG frame labeler cascade 1908. DAG frame labeler cascade 1908 uses sequence of tokens 1906, $T_n$, to generate token labels 1910, $L_n$. Token labels 1910, $L_n$ and/or tokens 1906, $T_n$, are then passed to entity interpreter 1912. Entity interpreter 1912 generates a DAG frame 1914. DAG frame 1914 in turn outputs structured information from multiturn dialogue 1916. Structured information from multiturn dialogue 1916 is represented by $D_n^F=\{Dn, T_n, L_a, F\}$ herein. $D_n^F=\{Dn, T_n, L_n, F_n\}$ represents the structure-annotated dialog session.

Figure 20:
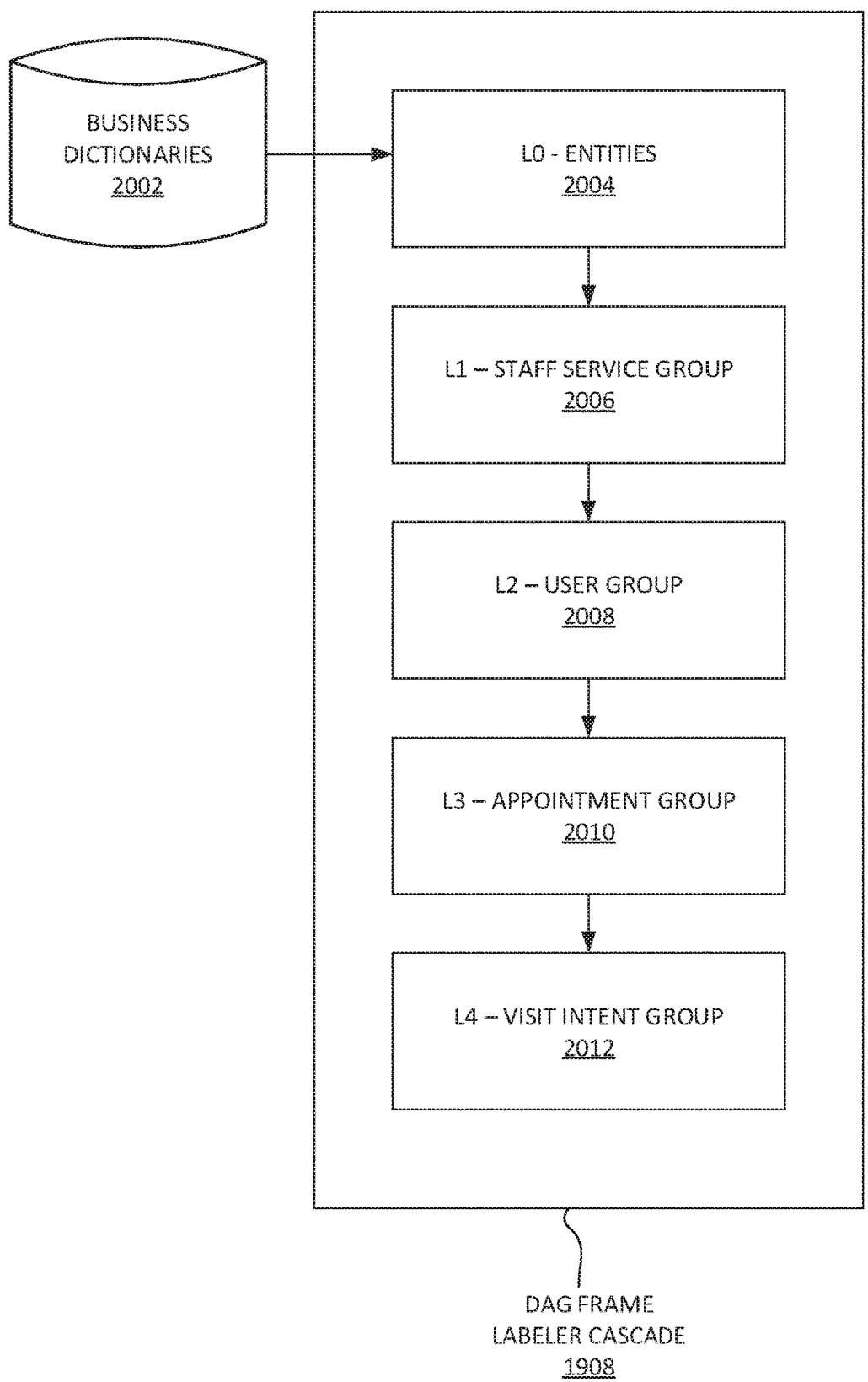
FIG. 20 illustrates an example DAG frame labeler cascade, according to some embodiments.

In one example, DAG frame labeler cascade 1908 can extract structured information from the conversation. FIG. 20 illustrates an example DAG frame labeler cascade 1908, according to some embodiments. DAG frame labeler cascade 1908 can access business dictionaries 2002. Business dictionaries 2002 can define staff, services, locations, and/or any other relevant entities.

The input to the DAG frame labeler cascade is then passed through various levels. Example levels of the DAG frame labeler cascade 1908 include, inter alia: L0—entities 2004, L1-staff service group 2006, L2—user group 2008, L3—appointment group 2010, L4—visit intent group 2012. The output of each level augments the input of the next level and so on. L0 can detect entities using business dictionaries 2002. L1 can determine a group of entity types that represent only the staff and service-related entities. L2 can determine the user service group. L3 can determine the appointment group. L4 can determine the visit intent (e.g. schedule appointment, request information, add a service, modify a service, etc.). It is noted that other examples can have more or less levels in a DAG frame labeler cascade. The number of levels can be dependent on the desired depth of the DAG frame. Each entity group can have its own level. It is noted that entities that are detected can be added as features to the word vectors by each level's labeler. In this way, a deep multi-level tag can be inferred in the form of structured information from a dialog session.

Figure 21:
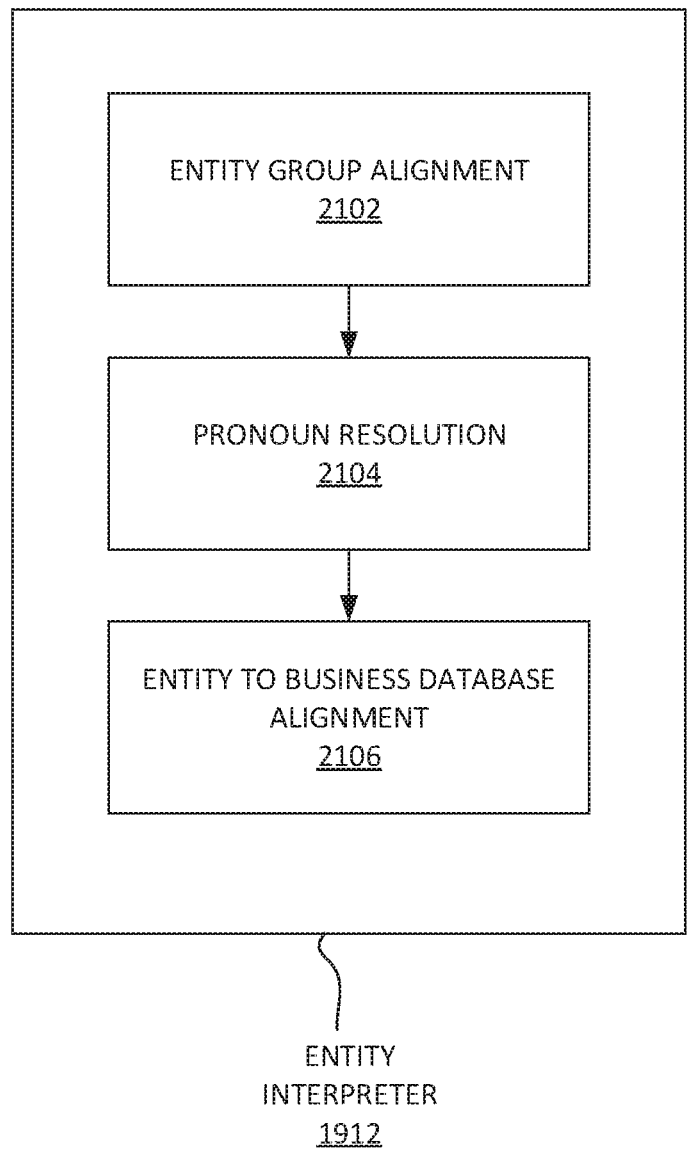
FIG. 21 illustrates an example entity interpreter, according to some embodiments.

FIG. 21 illustrates an example entity interpreter 1912, according to some embodiments. Entity interpreter 1912 can implement entity group alignment 2102. Entity group alignment 2102 can associate various services with various users from the various messages.

Entity interpreter 1912 can implement pronoun resolution 2104. Entity interpreter 1912 can implement entity to business database alignment 2106. Each phrase in a message is mapped to an entry business menu in the relevant business database. The phrase can be augmented with information from previously used services.

Figure 22:
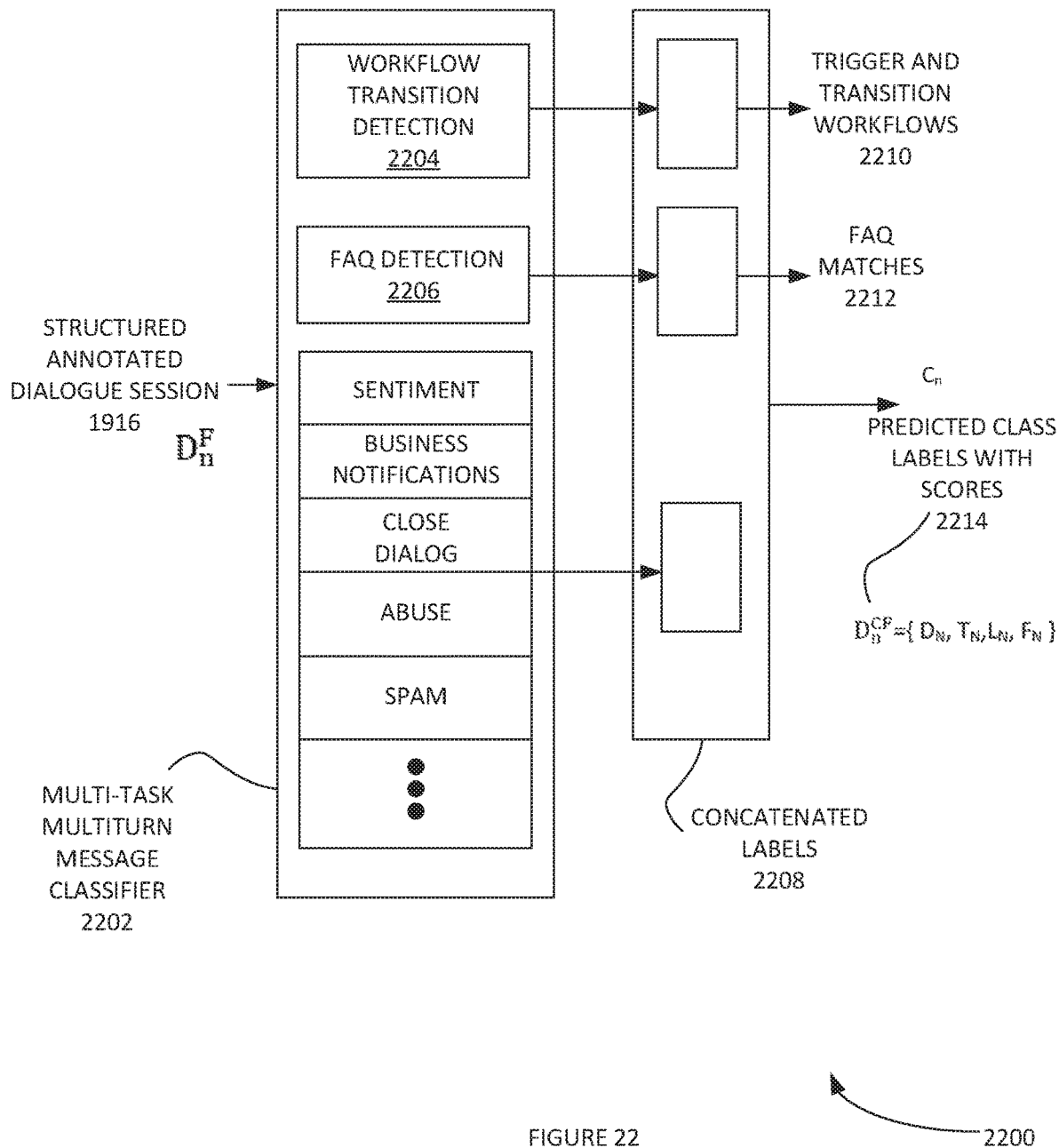
FIG. 22 illustrates an example multitask learning framework for multi-point communication, according to some embodiments.

FIG. 22 illustrates an example multitask learning framework 2200 for multi-point communication, according to some embodiments. Multitask learning framework 2200 can receive a DAG frame (e.g. as output by system 1900). Multitask learning framework 2200 can subject the DAG frame to a multi-task layer processing. The multi-task layer processing can infer everything that is needed to suitably respond to the incoming messages received by system 1900. Multitask learning framework 2200 can use multi-task layer processing to predict various class labels. Each prediction comes with a score that is associated with a confidence level. This is in preparation for the messages that can then be constructed in a response. Multitask learning framework 2200 can augment the DAG frame with class labels to enhance the structured annotated dialog session.

More specifically, multitask learning framework 2200 can receive structured information from multiturn dialogue 1916, $D_n^F$, of system 1900 with multi-task multiturn message classifier 2202.

Multi-task multiturn message classifier 2202 includes various detectors/filters. These can include workflow transition detection 2204 and FAQ detection 2206. Workflow transition detection 2204 can pass on detected workflow transitions to concatenated labels 2208. Concatenated labels 2208 can then trigger and transition workflows 2210.

FAQ detection 2206 can pass on detected FAQ to concatenated labels 2208. Concatenated labels 2208 can generate FAQ matches 2212.

Concatenated labels 2208 can generate concatenated labels 2208, $C_n$, from transition workflows 2210 and FAQ matches 2212. These can be used to create predicted class labels with scores 2214 by adding $C_n$ to $D_n^F$. In this way, multi-task multiturn message classifier 2202 generates $D_n^{CF}=\{Dn, T_n, L_n, F_n, C_n\}$. $D_n^{CF}=\{Dn, T_n, L_n, F_n, C_n\}$ can be passed to an AI-based business assistant (see example AI-based business assistant 2300 infra).

Figure 23:
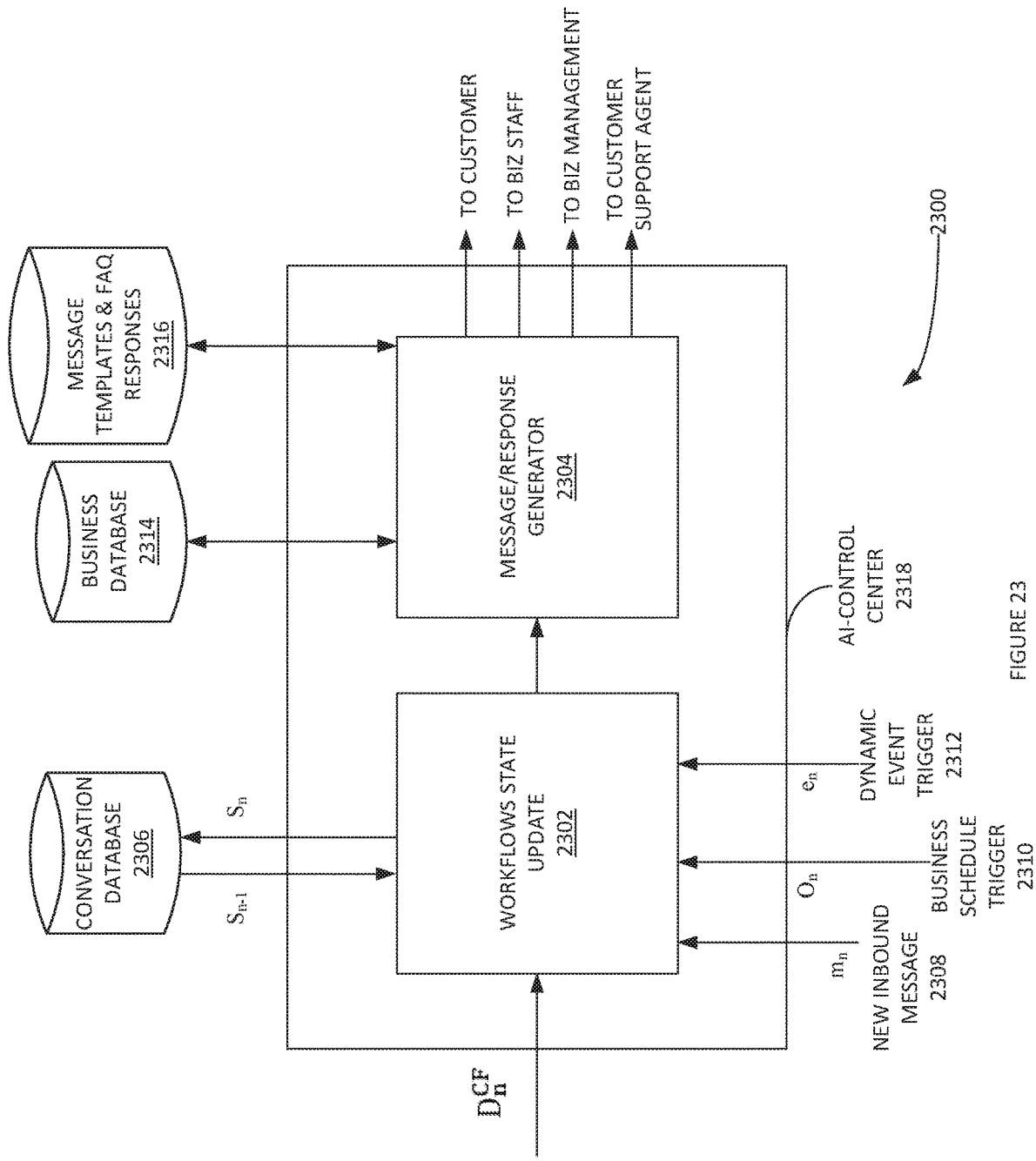
FIG. 23 illustrates an example AI-based business assistant, according to some embodiments.

FIG. 23 illustrates an example AI-based business assistant 2300, according to some embodiments. AI-based business assistant 2300 can assume DAG frames with class labels as input. These can be generated, for example, by the systems of FIGS. 19-22. AI-based business assistant 2300 can obtain the predicted structure and implement the MIDGO AI-based business assistant functionality. The MIDGO AI-based business assistant functionality determines how to respond to an incoming message. It is noted that there can be various other triggers besides an incoming message. These can cause AI-based business assistant 2300 to generate a message.

The message can be sent to various entities, such as, inter alia: a customer, an administrator, other business entity/level, etc. At a given instant, the AI-based business assistant 2300 communicates with multiple stakeholders simultaneously, coordinating where necessary to get complete the required task. To this end, it sends messages not only to the customer, but also to the business (potentially at multiple escalation levels, such as staff, manager, etc.). Equally important is how the AI-based business assistant 2300 sends messages to the customer support agent who is live handling that particular customer call, thereby enabling the agent to efficiently and accurately resolve the customer request.

AI-based business assistant 2300 implement a conversation via a plurality of workflows. A workflow can be a linear sequence of interactions. A rich interaction can involve stringing together multiple workflows. A set of FAQs and associated answers can be pulled by AI-based business assistant 2300 and integrated into the interaction as well.

AI-based business assistant 2300 can automatically respond to various inbound messages (e.g. $m_n$, etc.). AI-based business assistant 2300 also implements various specified business-related triggers (e.g. at nine a.m. run an appointment confirmation campaign for all appointments that are two days in the future, etc.). A business can also define a business-trigger that depends on a customer attribute. In another example, it would run a business scheduled campaign that reaches out to all customers who have missed a specified service during a specified period. In these, the AI-based customer support agent can automatically construct a message and communicate the message to a specified pool of customers based on one or more pre-specified triggers. AI-based business assistant 2300 can trigger workflow at any given point as well (e.g. based on a dynamic trigger, new incoming message, scheduled business trigger, etc.).

AI-based business assistant 2300 can include an AI-control center 2318. AI-control center 2318 recognizes triggers, events, etc. AI-control center 2318 interacts with a conversation database 2306. Conversation database 2306 includes a history of each conversation thus far. AI-control center 2318 also interacts with business database 2314. Business database 2314 captures and includes information about various business metrics. These can include, inter alia: business inventory, business schedule, business pricing structures, business services, CRM system(s), etc. AI-control center 2318 can use information obtained from the interactions with conversation database 2306 and business database 2314 to generate an output. The output can also be based on the structured information of dialog and the various triggers, AI-control center 2318 can use workflows state update module 2302 to update a workflow state. $S_{n-1}$ can be the state of the conversation at time point, n−1 (e.g. before nth event) that triggers AI-control center 2318. Workflows state update module 2302 can implement a compute and then output an updated state as of time n and store it back into conversation database 2306.

A conversation state can be, inter alia: a list of active workflows, a list of active workflow states, etc. Conversation database 2306 also stores call metadata (e.g. includes caller identifier, reason of call, call location, type of calling device, calling method (e.g. call, text, voice mail, messenger system, etc.). Conversation database 2306 stores a sequence of events and triggers that were part of each session.

More specifically, AI-based business assistant 2300 receives predicted class labels with scores 2214, $D_n^{CF}=\{Dn, T_n, L_n, F_n, C_n\}$. In AI-based business assistant 2300, workflows state update module 2302 can receive $D_n^{CF}=\{Dn, T_n, L_n, F_n, C_n\}$. Workflows state update module 2302 can also access conversation database 2306. Workflows state update module 2302 can receive new inbound message 2308. New inbound message 2308 can be represented by $m_n$. Workflows state update module 2302 can receive business schedule trigger 2310. Business schedule trigger 2310 can be represented by $O_n$. $O_n$ can be business scheduled outbound triggers. Workflows state update module 2302 can receive dynamic event trigger 2312. Dynamic event trigger 2312 can be represented by $e_n$. $e_n$ can be dynamic event triggers (e.g. guest has checked in or checked out at a spa, visitor on a website fills out a form requesting more information, etc.). Dynamic event triggers may not be scheduled but can be detected to occur. In one example, an unresponsive user can be a trigger to escalate the user contact session (e.g. a call) with a pass off to a human customer agent.

Using the content of conversation database 2306, $m_n$, $O_n$, and $e_n$; workflows state update module 2302 can update the state of $D_n^{CF}$. This can be sent to message/response generator 2304. Message/response generator 2304 can use business database 2314 and message templates 2316 to generate a message and/or response. Message/response generator 2304 can obtain various information from business database 2314, such as: business inventory, schedules, FAQs, etc. The workflow in a given state can instruct an action to be taken. Message templates 2316 can include message templates that include message content that enables the action to be taken via a message. For example, a message template can be provided for every message that the AI-based business assistant 2300 can respond with. Message templates 2316 can also include a set of indexed responses to FAQs as well.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed:

1. A computerized method comprising:
  receiving a dialog session, wherein the dialog session comprises a set of new inbound messages;
  feeding the dialog session into tokenizer;
  with the tokenizer, generating a set of tokens by breaking the new inbound messages into a sequence of tokens;
  providing the tokens to a DAG frame labeler cascade;
  with the DAG frame labeler cascade, using a sequence of tokens to generate a set of token labels, wherein the input to the DAG frame labeler cascade is then passed to a set of levels, wherein a number of levels is dependent on a desired depth of the DAG frame, and wherein each entity group has its own level;
  passing, with the DAG frame labeler cascade, the token labels and tokens to an entity interpreter;
  with the entity interpreter, generating a DAG frame, wherein the entity interpreter implements an entity group alignment, wherein the entity group alignment associates a specified set of services with one or more customers from the set of new inbound messages, wherein entity interpreter implements a pronoun resolution operation;
  with the DAG frame, outputting a structured information from a multiturn dialogue; and
  with multitask learning framework:
    receiving the DAG frame,
    subject the DAG frame to a multi-task layer processing, wherein the multi-task layer processing infer a response to an incoming messages,
    using the multi-task layer processing to predict various class label, wherein each prediction comes with a score that is associated with a confidence level in preparation for a set of messages that is constructed in a response, and
    augmenting the DAG frame with class labels to enhance the structured annotated dialog session.

2. The computerized method of claim 1, wherein the structured information from multiturn dialogue represents a structure-annotated dialog session.

3. The computerized method of claim 1, wherein the DAG frame labeler cascade accesses a business dictionary that defines a list of staff, services, and locations.

4. The computerized method of claim 3, wherein the entity interpreter implements an entity to business database alignment operation where each phrase representing a detected entity in a message of the set of new inbound messages is mapped to an entry in the business menu or an inventory in relevant business database.

5. The computerized method of claim 1 further comprising:
   providing the structured information from the multiturn dialogue into a multi-task multiturn message classifier.

6. The computerized method of claim 5, wherein the multi-task multiturn message classifier implements workflow transition detection and frequently asked questions (FAQ) detection.

7. The computerized method of claim 6, wherein the workflow transition detection passes on a set of detected workflow transitions to a concatenated labeler.

8. The computerized method of claim 7, wherein the concatenated labeler generates a set of FAQ matches and concatenated labels.

9. The computerized method of claim 8, wherein the set of FAQ matches and concatenated labels are used to generate a set of predicted class labels with scores.

10. The computerized method of claim 9 further comprising:
    passing the set of predicted class labels with scores to an artificial intelligent (AI)-based business assistant.

11. The computerized method of claim 10, wherein the AI-based business assistant uses the set of predicted class labels with scores to update a workflow state.

12. The computerized method for claim 10, wherein the AI-based business assistant uses the set of predicted class labels with scores to generate a message to a customer, a business entity, or a customer support agent.

* * * * *